United States Patent
Iki et al.

(10) Patent No.: US 8,148,870 B2
(45) Date of Patent: Apr. 3, 2012

(54) COIL ASSEMBLY FOR ROTATING ELECTRIC MACHINE

(75) Inventors: Tomotaka Iki, Wako (JP); Masaru Ozawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 369 days.

(21) Appl. No.: 12/310,320

(22) PCT Filed: Aug. 30, 2007

(86) PCT No.: PCT/JP2007/067344
§ 371 (c)(1),
(2), (4) Date: Feb. 20, 2009

(87) PCT Pub. No.: WO2008/026771
PCT Pub. Date: Mar. 6, 2008

(65) Prior Publication Data
US 2010/0001610 A1 Jan. 7, 2010

(30) Foreign Application Priority Data
Aug. 30, 2006 (JP) .................................. 2006-234249

(51) Int. Cl.
*H02K 21/12* (2006.01)
(52) U.S. Cl. ..................................... 310/254.1; 310/208
(58) Field of Classification Search .......... 310/201–208, 310/254.1, 266, 268
See application file for complete search history.

(56) References Cited

U.S. PATENT DOCUMENTS

| | | | |
|---|---|---|---|
| 3,090,880 A | 5/1963 | Raymond | |
| 3,144,574 A | 8/1964 | Henry-Baudot | |
| 3,189,770 A | 6/1965 | Henry-Baudot | |
| 3,488,539 A | 1/1970 | Tucker | |
| 3,790,835 A | 2/1974 | Takeda | |
| 3,944,857 A | 3/1976 | Faulhaber | |
| 4,458,228 A * | 7/1984 | Baumgartner | 335/229 |
| 4,484,097 A * | 11/1984 | Kanayama et al. | 310/268 |
| 4,728,390 A * | 3/1988 | Yamamoto et al. | 216/48 |
| 5,177,392 A * | 1/1993 | Scott | 310/268 |
| 5,705,868 A * | 1/1998 | Cox et al. | 310/71 |
| 5,744,896 A | 4/1998 | Kessinger, Jr. et al. | |
| 6,121,702 A * | 9/2000 | Tischer et al. | 310/71 |

(Continued)

FOREIGN PATENT DOCUMENTS

GB  1 104 663 A  12/1965

(Continued)

OTHER PUBLICATIONS

Japanese Office Action application No. P2006-234249 mailed Jul. 20, 2010.

*Primary Examiner* — Dang Le
(74) *Attorney, Agent, or Firm* — Squire Sanders (US) LLP

(57) ABSTRACT

A coil assembly for a rotating electric machine is a stator coil for use in the stator of a motor or the like, which includes a coil plate composed of at least two coil plate elements respectively provided with an internal peripheral portion and an external peripheral portion and having predetermined wiring patterns formed by slits. The coil plate elements are bonded together at their internal peripheral portion and external peripheral portion while leaving the medial portion lying between the internal peripheral portion and the external peripheral portion spaced apart, so as to form the predetermined coil winding patterns.

25 Claims, 19 Drawing Sheets

U.S. PATENT DOCUMENTS

| | | | |
|---|---|---|---|
| 6,191,511 B1 * | 2/2001 | Zysset | 310/60 A |
| 6,411,002 B1 | 6/2002 | Smith et al. | |
| 7,148,594 B2 * | 12/2006 | Rajasingham | 310/75 C |

FOREIGN PATENT DOCUMENTS

| | | |
|---|---|---|
| JP | 48-442 | 1/1973 |
| JP | 59-059036 | 4/1984 |
| JP | 59-059036 A | 4/1984 |
| JP | 59-165935 | 9/1984 |
| JP | 59-165935 A | 9/1984 |
| JP | 62-19072 U | 2/1987 |

\* cited by examiner

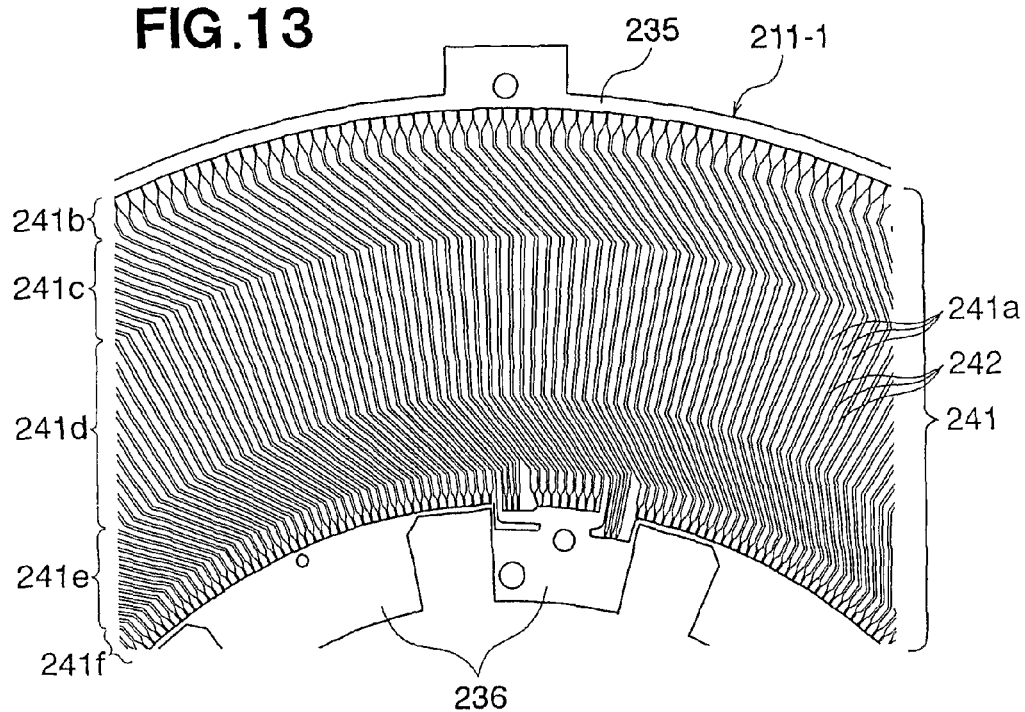
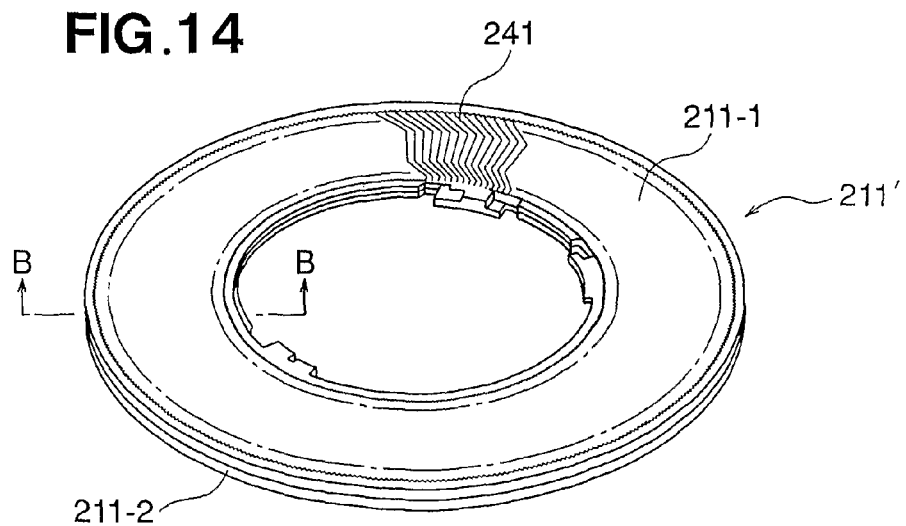

COIL ASSEMBLY FOR ROTATING ELECTRIC MACHINE

BACKGROUND OF THE INVENTION

1. Field of the Invention

The present invention relates to a coil assembly (often called simply "coil") for a rotating electric machine, to a rotating electric machine employing the same, and to a manufacturing method for these. In particular, the present invention relates to a coil assembly for an axial gap rotating electric machine, to a rotating electric machine employing the same, and to a manufacturing method for these.

2. Description of the Related Art

Rotating electric machines of axial type (electric motors and electric generators) equipped with a disk-shaped rotating armature coil are known in the art to date. Since rotating electric machines of axial type can be made shorter in length in the axial direction than radial gap rotating electric machines, they enjoy wide-spread use in applications in which axial length must be kept to a minimum, as, for example, in audio equipment, video recorders, computer disk drives, automotive radiator fans, window lifts, and the like.

One type of coil used in conventional rotating electric machines of axial type is a disk-shaped coil composed of a plate of conductive material (copper or aluminum) that has been formed into a coil pattern by pressing or other process, and the coil pattern then affixed to an insulating sheet or similar material and connected to a different coil pattern by soldering or welding. Prior art examples of such disk-shaped coils are disclosed in U.S. Pat. No. 3,090,880, U.S. Pat. No. 3,189,770 and U.S. Pat. No. 3,144,574.

Another known type of coil used in axial rotating electric machines is a disk-shaped coil produced by a process of arranging, in the circumferential direction, a required number of formed coil units of wound magnet wire.

Prior art publications relating to coils for rotating electric machines and related technologies include ten patent publications, specifically, U.S. Pat. Nos. 3,090,880, 3,189,770, 3,144,574, 3,944,857, and 6,411,002; Japanese Patent Laid-Open Publication 59-165935; U.S. Pat. No. 3,488,539; Japanese Patent Post-Exam Publication 48-442; and U.S. Pat. Nos. 3,790,835 and 5,744,896.

The disk-shaped coils disclosed in U.S. Pat. Nos. 3,090,880, 3,189,770, and 3,144,574 are fabricated through the application of printed circuit board production technology; since the coil pattern affixed onto the insulating board is extremely thin, there are necessarily limitations as to the amount of current that can flow through the coil. For this reason, the coils disclosed in U.S. Pat. Nos. 3,090,880, 3,189,770, and 3,144,574 are limited to application in rotating electric machines having low output on the order of several hundred watts to several kilowatts.

To make a coil for a rotating electric machine adapted for high output/high torque applications, it is necessary to increase the cross-sectional area of the coil to boost its electric current capacity. A known method for enabling this, as disclosed in Japanese Patent Laid-Open Publication 59-165935, U.S. Pat. No. 3,488,539, and Japanese Patent Post-Exam Publication 48-442, is to stack printed circuit boards in multiple stages and electrically connect the different coil patterns to each other via through-holes or the like. Such coils become thicker in relative terms and acquire higher electric current capacity as the number of stages increases in the printed circuit boards, but since the insulated parts of the printed circuit boards will also have a multistage design at the same time, the magnetic gap will increase, possibly causing a drop in magnetic flux level or a drop in output of the rotating electric machine.

Also known in the art is a coil of the type disclosed in U.S. Pat. No. 3,488,539 and Japanese Examined Patent Application 48-442, composed of two layers which are bar-shaped half-coil conductors that are shaped to the necessary cross-sectional area by bending, punching, or other mechanical working process, and provided with an insulating board disposed between them. The ends of the two half-coil conductor layers form a disk-shaped coil by being joined by welding or the like, so as to form a coil loop. However, in a coil of this type, if the conductor width of the half-coils perpendicular to the magnetic flux is reduced and the number of conductors is increased with the object of reducing eddy current or boosting voltage, the half-coil conductors will have lower rigidity, making it difficult to machine the half-coil conductor pattern with a high degree of accuracy, or to position the two half-coil layers when connecting them. Additionally, smaller width in the half-coil connecting portions and the increased number of connecting portions will result in a more difficult welding or other joining process.

According to the designs disclosed in U.S. Pat. Nos. 3,790,835 and 5,744,896, the two straight sides of a coil unit, which are effective for torque, are positioned mutually adjacent to the two sides of the other coil unit while keeping the thickness in the coil section facing the magnets less than that in the coil end connecting portion, thus reducing the drop in magnetic flux level caused by the increased magnetic air gap. With this design, since the coil end connecting portion where the coil units overlap is positioned outside the zone facing the magnets, it will be necessary for the coil end connecting portion to project out in excess beyond the inner and outer peripheral sides of the face which faces the magnets. As a result, the coil loop will have a longer path length, and the resistance of the coil will be higher.

Arrangements for reducing the diametrical length of the coil end connecting portion include bending up the coil end connecting portion, or forming the portion to desired shape together with the coil end connecting portion of the other coil unit. However, since the coil units are composed of a number of bundled wires, if a forming process such as that mentioned above is performed, the wire diameter for a serviceable coil unit will be limited. Specifically, if wire diameter is increased to accommodate larger current, it will be more difficult to bend or form the coil end connecting portion, whereas, conversely, if there is adopted a design in which a larger number of finer wires is bundled and connected in parallel to provide the necessary current path cross sectional area, it will be necessary to electrically connect the individual wires, and the reliability of the electrical connections will be lower as the number of wires increases. Moreover, commonly used magnet wires are round and difficult to wind in alignment, and thus the arrangements disclosed in U.S. Pat. Nos. 3,790,835 and 5,744,896 will have a lower conductor fill factor in the coil.

In particular, in cases in which a coil is used in a slotless, coreless, or similar arrangement, the space occupied by the coil will be within the air gap of the magnetic circuit, and a greater coil thickness will mean a larger air gap and a consequent possible drop in magnetic flux level, leading to a lower output and torque of the rotating electric machine. In order to prevent such a drop in output and torque, it will be necessary to increase the magnetic flux level within the air gap, but if magnet usage is increased with the aim of increasing magnetic flux, the rotating electric machine will be bulkier, heavier, and more expensive to manufacture.

With the foregoing in view, there exists a need for a coil for a rotating electric machine which is endowed with a high conductor lamination factor and dimensional accuracy, and which is moreover simple to manufacture and is capable of service at high current; for a method of manufacturing the same; for a rotating electric machine; and for a method of manufacturing the same.

SUMMARY OF THE INVENTION

According to the present invention, there is provided a coil assembly for use in a stator of a rotating electric machine, which comprises a coil plate having at least two coil plate elements, the coil plate elements respectively having an internal peripheral portion and an external peripheral portion as well as predetermined wiring patterns formed by slits, and being bonded together at the internal peripheral portion and the external peripheral portion while spaced apart in a medial portion lying between the internal peripheral portion and the external peripheral portion, so as to provide predetermined coil winding patterns.

In the coil assembly thus arranged, the conductor lamination factor can be increased by forming very narrow slits in consideration of insulation properties and processability, thus making it possible to produce a low-resistance coil. Moreover, since the stator coil is fabricated by use of a thin plate, it is possible to achieve an axial disk type rotating electric machine in which the rotating electric machine as such is extremely thin.

Further, the coil plate elements are bonded in a layered structure to provide the coil with a more compact shape overall. In cases in which the rotating electric machine of the present invention is employed as an in-wheel motor, for example, the axial dimension of the motor within the wheel can be kept to a minimum, affording a higher degree of freedom in layout around the wheel of the brakes, suspension, supporting structural components, and the like.

Moreover, a high conductor lamination factor and dimensional accuracy can be achieved in the coil assembly arranged as above, which is simple to manufacture and is capable of service at high current.

BRIEF DESCRIPTION OF THE DRAWINGS

FIG. 13 is an enlarged view showing on an enlarged scale the rectangular area A of FIG. 12;

FIG. 14 is a perspective view illustrating the basic components of the first stator coil and the basic components of the second stator coil in the bonded state in a second process;

DETAILED DESCRIPTION OF THE PREFERRED EMBODIMENTS

Certain preferred embodiments of the present invention will be described in detail below, by way of example only, with reference to the accompanying drawings.

It is possible for a coil assembly (hereafter simply called "coil") for a rotating electric machine of the present invention to be used in both electric motors and electric generators; the description of the embodiments herein takes the example of application in an electric motor.

First, referring to FIGS. 1 through 5, the overall configuration of an exemplary axial type motor embodying the coil for a rotating electric machine of the present invention will be described. In this embodiment, the motor 10 will be shown by way of example as a rotating electric machine of in-wheel type used for driving a vehicle, accommodated entirely within the interior of each of a number of wheels with which the vehicle is equipped, and adapted to provide direct rotary driving of each of the wheels.

However, the coil for a rotating electric machine pertaining to the present invention is not limited to an in-wheel motor, and is of course applicable generally to motors of similar structure and shape.

Figure 1:
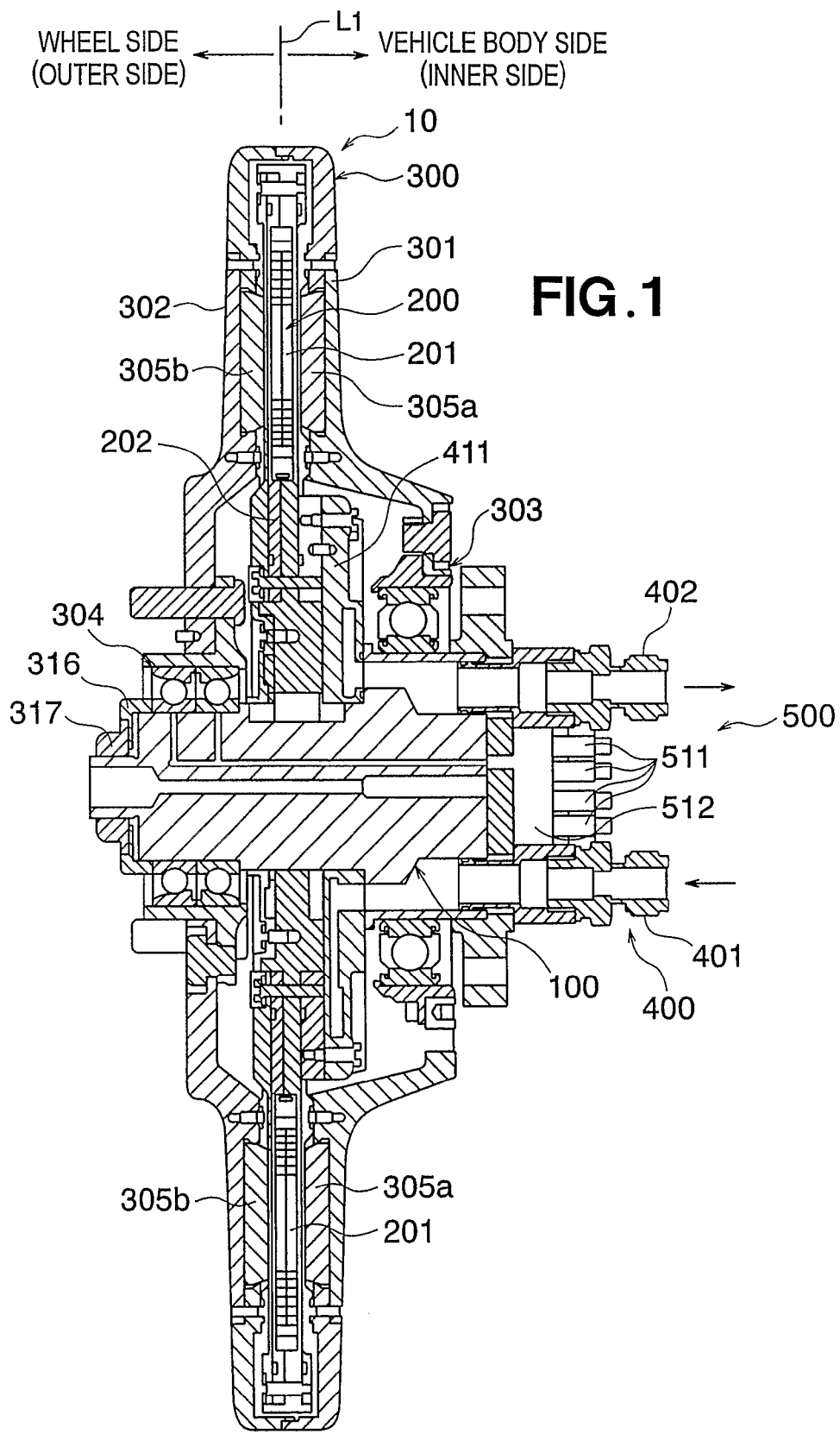
FIG. 1 is a longitudinal sectional view illustrating an electric machine (electric motor) housing the coil assembly for a rotating electric machine, according to an embodiment of the present invention.
Figure 2:
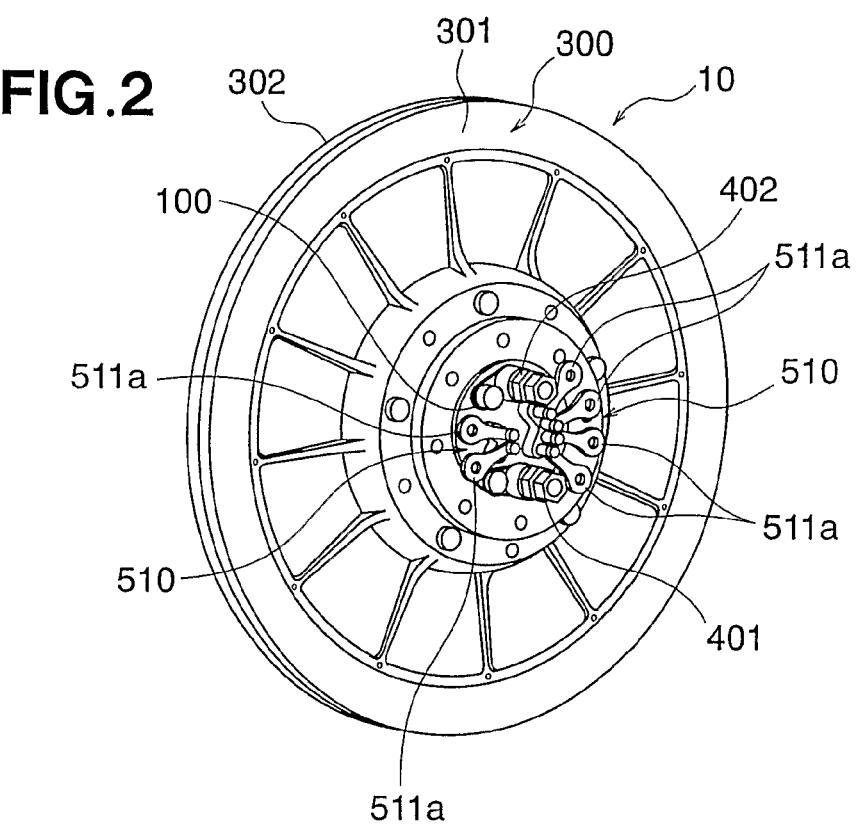
FIG. 2 is a perspective view showing, from the inner side, the side face of the motor shown in FIG. 1.
Figure 3:
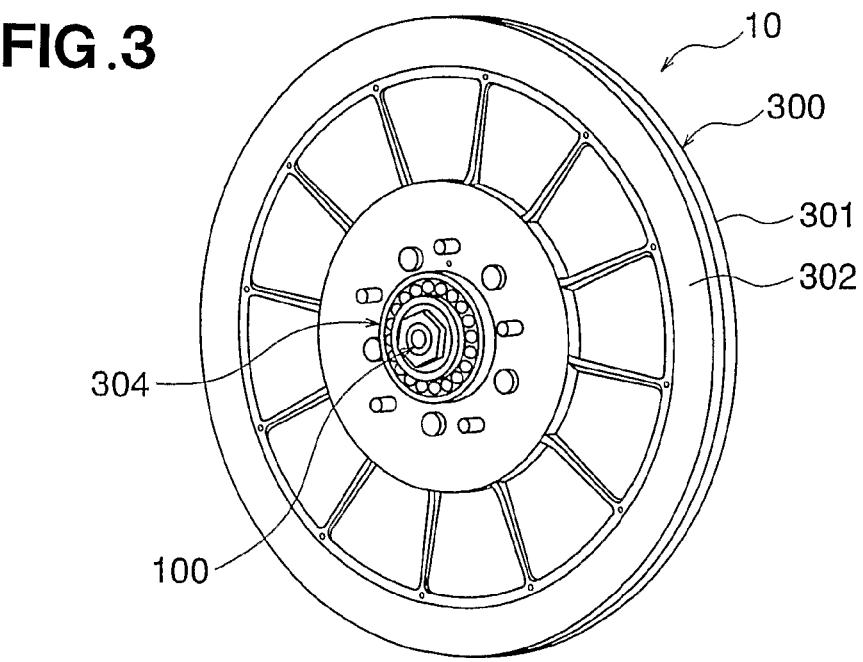
FIG. 3 is a perspective view showing, from the outer side, the side face of the motor shown in FIG. 1.
Figure 4:
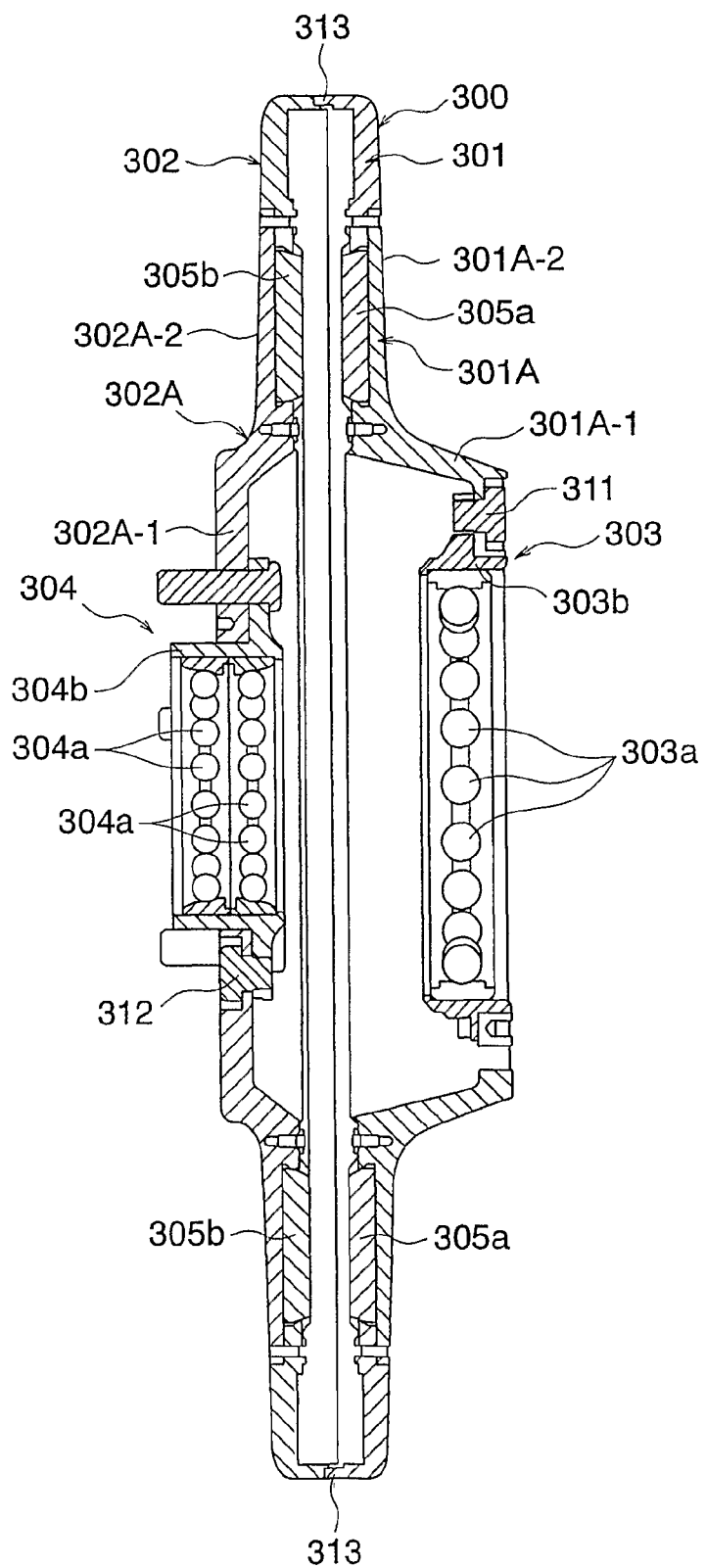
FIG. 4 is a longitudinal sectional view showing the rotating part of the motor shown in FIG. 1.
Figure 5:
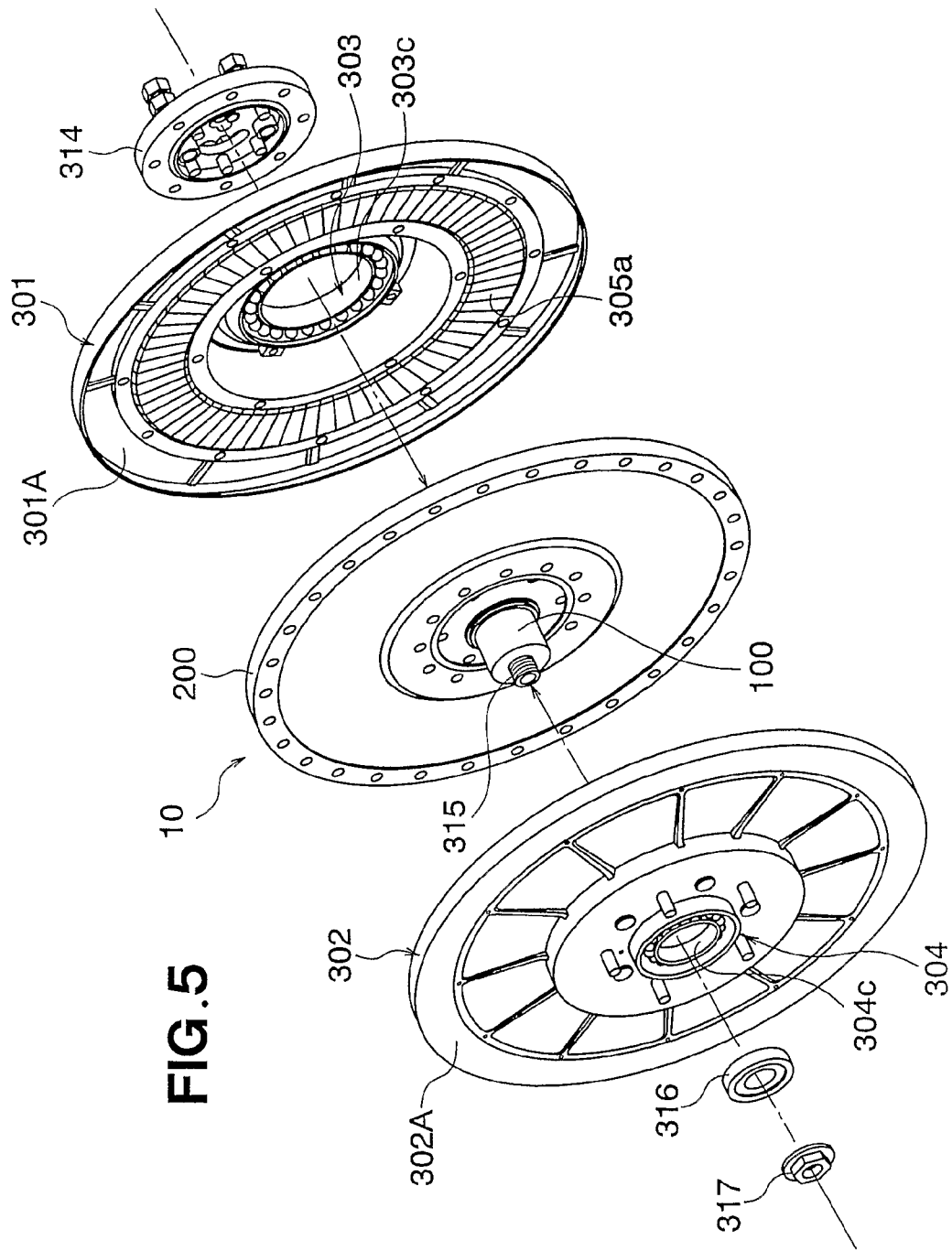
FIG. 5 is an exploded view of the motor shown in FIG. 1.

FIG. 1 is a longitudinal sectional view of the motor 10; FIG. 2 is an exterior perspective view showing a side face of the motor from the inner side; FIG. 3 is an exterior perspective view showing a side face of the motor from the outer side; FIG. 4 is a longitudinal sectional view taken of the rotating part of the motor 10; and FIG. 5 is an exploded view of the motor 10.

As noted, the motor 10 is a motor adapted for assembly directly into the wheel. Accordingly, in FIG. 1, line L1 denotes a boundary line, the right side of the boundary line L1 lies towards the vehicle, and the left side lies towards the wheel. With the vehicle body as reference, in FIG. 1, the right side of the boundary line L1 represents the inner side, and the left side the outer side.

In broad terms, the constitutional elements of the motor 10 include a shaft-shaped center portion 100 provided with a circular rod shape and fastened to the vehicle body; a generally disk-shaped stator 200 fastened about the perimeter of the shaft-shaped center portion 100; and a generally disk-shaped rotor 300 positioned so as to cover the stator 200 from either side and rotatably disposed about the perimeter of the shaft-shaped center portion 100.

A cooling system 400 and a power supply system 500 are attached to the shaft-shaped center portion 100 and the stator 200. As will be discussed later, the stator 200 includes a stator coil 202 disposed in an annular region at the perimeter thereof. The stator 200 is additionally furnished at its center portion with a stator holder assembly 202.

The shaft-shaped center portion 100 and the stator 200 are fastened to the vehicle body (not shown). The shaft-shaped center portion 100 and the stator 200 constitute a static system.

The rotor 300 is composed, with the stator 200 as reference, of an inner rotor 301 situated towards the vehicle body and an outer rotor 302 situated towards the wheel. The stator 200 is disposed in a positional relationship sandwiched from either side by the inner rotor 301 and the outer rotor 302. The inner rotor 301 is rotatably attached about the shaft-shaped center portion 100 by means of a sealed inner ball bearing structure 303. The outer rotor 302 is rotatably attached about the shaft-shaped center portion 100 by means of a sealed outer ball bearing structure 304. The sealed inner ball bearing structure 303 and the sealed outer ball bearing structure 304 each have a bearing structure of a type in which the inner ring is fixed and stationary, and the outer ring rotates.

The inner rotor 301 and the outer rotor 302 are fitted and bonded together at the circumferential portions situated at their outside edges. The inner rotor 301 and the outer rotor 302 are constituted so as to unite and rotate as the rotor 300. The rotor 300 composed of the inner rotor 301 and the outer rotor 302 is linked to the wheel (not shown).

The inner rotor 301 and the outer rotor 302 are each provided, in an area thereof facing the area where the stator coil of the stator 200 is positioned, with a plurality of magnets 305a, 305b arrayed in the circumferential direction. The magnets 305a, 305b are arrayed in a so-called Halbach array structure. As a result, leaking magnetic flux is minimized, while at the same time attaining lighter weight, due to the absence of a yoke. The material of the magnets 305a, 305b is Nd—Fe—B, for example. In order to achieve rigidity and lighter weight, aluminum alloy (A2017) is used as the material for the inner rotor 301 and the outer rotor 302.

When the stator coil 201 of the stator 200 is supplied with electrical current of each phase (U, V, W), an electromagnetic induction effect will be produced between the stator coil 201 of the stator 200 and the magnets 305a, 305b of the inner rotor 302 and the outer rotor 304, causing the rotor 300 to rotate. As the rotor 300 rotates, the wheel connected to the rotor will turn as well.

As shown in FIGS. 2 and 3, the motor 10 has the form of a thin circular plate overall.

As shown in FIG. 2 in particular, the interface portions of the cooling system 400 and the power supply system 500 (the coolant supply line 401 and the coolant discharge line 402, the power supply terminals 511a and the like) are disposed in an centralized arrangement, utilizing the shaft-shaped center portion 100 of the static system situated in the center portion of the motor 10. As shown in FIG. 2, the single coolant supply line 401 and the single coolant discharge line 402 project out from the center portion of the side face of the motor 10 lying towards the vehicle, i.e. on the end face of the shaft-shaped center portion 100 on the inner rotor 301 side, and six power supply terminals 511a are disposed there as well. Symbol 510 in FIG. 2 denotes a power supply bus bar module.

In FIG. 1, symbol 511 denotes an interface bus bar, and symbol 512 denotes an insulating collar.

In FIG. 4, only the ball bearings 303a, 304a and the outer ring portions 303b, 304b are shown from among the ball bearing structures 303, 304. The outer ball bearing structure 304 is furnished with a bearing structure that employs a back-to-back combined angular ball bearing.

Furthermore, in FIG. 4, the inner rotor 301 has a housing 301A. The housing 301A has a generally disk shape overall, with an outwardly projecting center tube portion 301A-1. The aforementioned outer ring portion 303b is joined by means of a fastener 311 to the inside of the end of the center tube portion 301A-1. The aforementioned magnets 305a, arranged in a predetermined number in the circumferential direction, are positioned at the inside face of a perimeter ring-shaped area 301A-2 of the housing 301A. The outer rotor 302 has a similar housing 302A. The housing 302A has a substantial disk shape, with the aforementioned outer ring portion 304b joined by means of a fastener 312 to the internal peripheral portion of a center tube portion 302A-1. The aforementioned magnets 305b, arranged in a predetermined number in the circumferential direction, are positioned at the inside face of a perimeter ring-shaped area 302A-2 of the housing 302A.

In FIG. 4, symbol 313 denotes a mating fitting portion between the housing 301A of the inner rotor 301 and the housing 302A of the outer rotor 302. The mating fitting portion 313 is formed extending around the entire perimeter.

Next, the exploded structure of the motor 10 will be described with reference to FIG. 5. The stator 200, with the shaft-shaped center portion 100 attached at its center axis portion, is first positioned; the inner rotor 301 is positioned to the inner side thereof; and the outer rotor 302 is positioned to the outer side thereof. The inner rotor 301 is attached to the inner side of the stator 200 by securing the right end of the shaft-shaped center portion 100 in a hole in the inner ring portion 303c of the ball bearing structure 303 of the inner rotor 301. The outer rotor 302 is attached to the outer side of the stator 200 by securing the left end of the shaft-shaped center portion 100 in a hole in the inner ring portion 304c of the ball bearing structure 304 of the outer rotor 302. At this time, the peripheral edges between the housing 301A of the inner rotor 301 and the housing 302A of the outer rotor 302 fit together and form the aforementioned mating fitting portion 313, joining the inner rotor 301 with the outer rotor 302. The housings 301A, 302A are connected according to a boltless arrangement by utilizing the attracting force of the magnets 305a, 305b and the mating structure of the housing 301A and the housing 302A in the mating fitting portion 313.

In the preceding discussion, the stator 200, the inner rotor 301, and the outer rotor 302 are each provided as pre-assembled modules.

In the assembled state described above, a bearing structure detachment preventing member 314 is fastened to the right end of the shaft-shaped center portion 100 which projects towards the inner side beyond the inner rotor 301. On the left end of the shaft-shaped center portion 100 which projects towards the outer side beyond the outer rotor 302, a nut 317 is threaded onto a female thread portion 315 via a ring member 316, thereby rotatably fastening the outer rotor 302 to the shaft-shaped center portion 100.

In actual practice, a cover designed to prevent the magnets from falling out would be disposed on the outermost face of the inner rotor 301 on the outer side thereof, but the cover is removed for convenience in FIG. 5 to make it easier to see the magnet 305*a* array.

As discussed above, the motor 10 pertaining to the present embodiment is an axial disk type motor composed of a very thin stator 200 (coil plate 211), an inner rotor 301, and an outer rotor 302. In the motor 10 of the present embodiment, the holder assemblies, such as the coil holder 212 of the stator 200, are composed of GFRP so that magnet eddy loss or circulation loss in the holder portions are essentially zero, and so that the stator 200 is lightweight.

Figure 6:
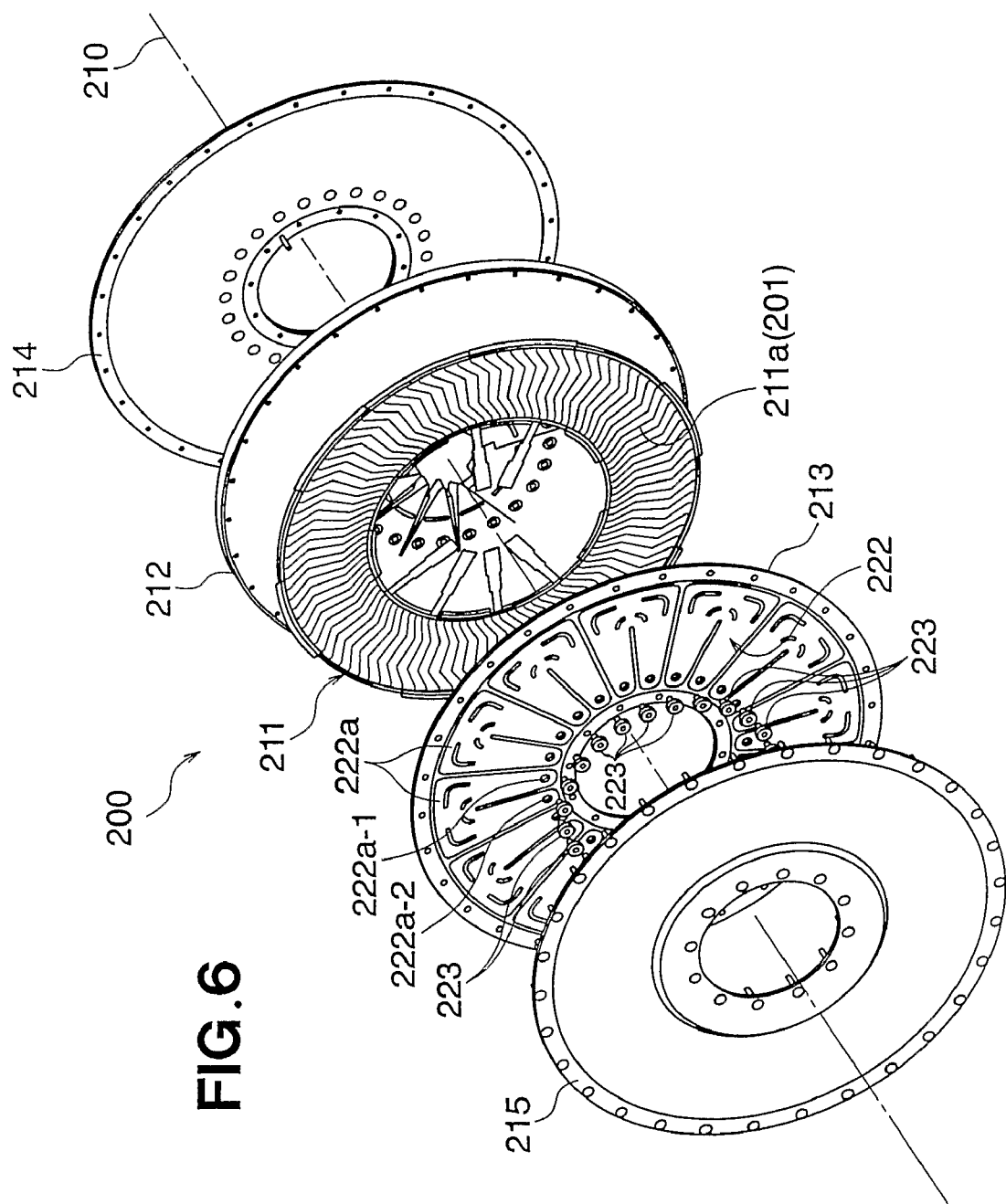
FIG. 6 is an exploded view of the entire stator, as viewed from the outer side.

Next, the configuration of the stator 200 will be described in detail with reference to FIGS. 6 and 7. FIG. 6 is an exploded view of the entire stator 200 viewed from the outer side; and FIG. 7 is an exploded view of the principal parts of the stator 200 viewed from the inner side.

As shown in FIG. 6, the stator 200, which has an overall shape resembling a disk or circular plate or having a center hole portion, is furnished with a disk-shaped coil plate 211 present at a central location on an axis 210, a disk-shaped coil holder plate 212 situated on the inner side of the coil plate 211 (towards the back in FIG. 6, and towards the front in FIG. 7), and a disk-shaped coil cover plate 213 situated on the outer side of the coil plate 211 (towards the front in FIG. 6). In this state, the coil cover plate 213 is fastened over the coil plate 211 by attaching the coil cover plate 213 to the coil holder plate 212 with a fastener (not shown). In the above arrangement, there is further provided a disk-shaped inner cover plate 214 situated on the inner side of the coil holder plate 212, and an outer cover plate 215 situated on the outer side of the coil cover plate 213.

The material of the coil holder plate 212, the coil cover plate 213, the inner cover plate 214, and the outer cover plate 215 is one that is insulating and non-magnetic, preferably GFRP (glass fiber-reinforced plastic).

Figure 7:
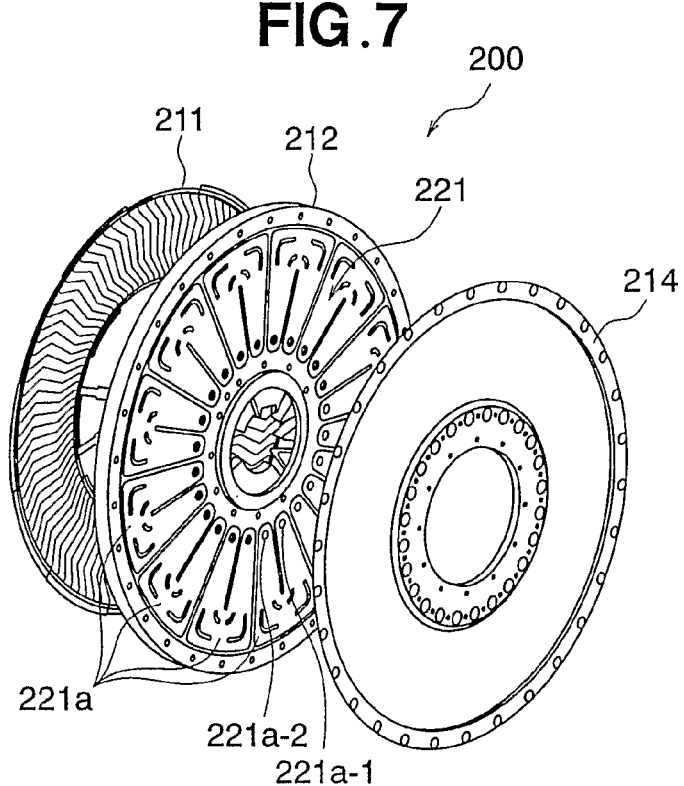
FIG. 7 is an exploded view of the principal parts of the stator, as viewed from the inner side.

As shown in FIGS. 6 and 7, coolant flow passage structures 221, 222 are formed respectively on the side face on the inner side of the coil holder plate 212 and the side face on the outer side of the coil cover plate 213.

The coolant flow passage structure 221 of the coil holder plate 212 is constituted, for example, by twelve unit coolant flow passages 221*a* arrayed in the circumferential direction. The coolant flow passage structure 221 composed of these twelve unit coolant flow passages 221*a* is formed by means of lands and grooves formed on the side wall portion on the inner side of the coil holder plate 212. Each of the twelve unit coolant flow passages 221*a* has a flow passage pattern extending from the internal peripheral edge to the external peripheral edge of the disk-shaped coil holder plate 212 and then back towards the internal peripheral edge. Accordingly, each of the twelve unit coolant flow passages 221*a* has a coolant supply hole 221*a*-1 and a coolant drain hole 221*a*-2 situated at the internal peripheral edge of the coil holder plate 212.

The structure of the coolant flow passage structure 222 of the coil cover plate 213 is basically the same as that of the coolant flow passage structure 221. The coolant flow passage structure 222 is constituted, for example, by twelve unit coolant flow passages 222*a* arrayed in the circumferential direction. The coolant flow passage structure 221 composed of these twelve unit coolant flow passages 222*a* is formed by means of lands and grooves formed on the side wall portion on the outer side of the coil cover plate 213. Each of the twelve unit coolant flow passages 222*a* has a flow passage pattern extending from the internal peripheral edge to the external peripheral edge of the disk-shaped coil cover plate 213 and then back towards the internal peripheral edge. Accordingly, each of the twelve unit coolant flow passages 222*a* has a coolant supply hole 222*a*-1 and a coolant drain hole 222*a*-2 situated at the internal peripheral edge of the coil cover plate 213.

In FIG. 6, a plurality of coil winding patterns 211*a* is formed in the coil plate 211 in the circumferential direction. These coil winding patterns 211*a* are formed of copper, for example, with the windings classed into three phases (the U phase, V phase, and W phase). Adjacent windings among the coil winding patterns 211*a* are insulated from each other. The coil winding patterns 211*a* are formed by etching technology and diffusion bonding technology or the like, discussed later. The coil winding patterns 211*a* could be formed of aluminum instead of copper.

The coil plate 211, the coil holder plate 212, the coil cover plate 213, the inner cover plate 214, and the outer cover plate 215 shown in FIG. 6 are juxtaposed and assembled into the stator 200 having a thin annular shape overall. The portion of the coil winding patterns 211*a* of the coil plate 211 in the stator 200 corresponds to the stator coil 201 mentioned earlier. With the stator 200 in the assembled state, the stator holder assembly 202 and the shaft-shaped center portion 100 mentioned earlier are attached.

In FIG. 6, the numerous bolts 223 are perforated bolts used for the purpose of permitting passage of coolant to the unit coolant flow passages 222*a* of the coolant flow passage structure 222 of the coil cover plate 213. These perforated bolts 223 allow coolant to pass from the coolant drain holes 221*a*-2 of the coil holder plate 212 in the supply line to the coolant supply holes 222*a*-1 of the coil cover plate 213, and coolant to pass from the coolant drain holes 222*a*-2 of the coil cover plate 213 to the coolant supply holes 221*a*-1 of the coil holder plate 212 in the drain line. These perforated bolts 223 are disposed in respective correspondence with the coolant supply holes 221*a*-1 and the coolant drain holes 222*a*-2 formed at the internal peripheral edge of the coil cover plate 213, and are threaded respectively into these coolant supply holes 221*a*-1 and coolant drain holes 222*a*-2. Specifically, the perforated bolts 223 constitute connecting means for connecting the coil holder 212 and the coil cover plate 213 which house the coil plate 211, as well as forming flow passages for supply and draining (return) of coolant between a cooling system separator 411 and the coolant flow passage structure 222 of the coil cover plate 213. The flow passages are obtained using coolant flow holes formed in their shafts.

The coolant flow passages are formed by means of lands and grooves formed on the coil cover plate 213. With the motor 10 completely assembled, the lands of the coolant flow passage structure 221 are in intimate contact against the facing inner cover plate 214, thereby ensuring fluid-tightness on the part of the coolant flow passages 221*a*. The lands of the coolant flow passage structure 221 are shaped so that the shape and placement of the lands allow coolant to flow smoothly through the coolant flow passages 221*a* without stagnation. The depth of the grooves of the coolant flow passage structure 221 (approximately 1 mm in the present embodiment) will be determined appropriately depending on factors such as the thickness of the coil holder plate 212, the material of the coolant, and the size and output of the motor 10.

The coolant (for example, water) is supplied from outside the motor 10 by a pump or the like, and cools the interior of the coil plate 211 by flowing in order through 401→411 (see FIG. 1)→221→441→401 of the shaft-shaped center portion 100. The coolant also cools the coil plate 211 from the outside by flowing in order through 401→411→211a-2→222a-1→223→222→223→222a-2→221a-1→441→401. The cooling system separator 411 shown in FIG. 1, together with the shaft-shaped center portion 100 and the stator 200, makes up a static system. This cooling system separator 411 distributes the coolant supply flow passages so as to produce the flows discussed above.

In the present embodiment, the stator 200 is sandwiched by the inner rotor 301 and the outer rotor 302, whereby the rotor internal space can be given a hermetic structure making it possible to prevent infiltration of dust and the like from the outside. With regard to the cooling structure of the stator 200, all of the coolant supply flow passages are formed within stationary components via the shaft-shaped center portion 100, which in conjunction with the completely hermetic nature of the rotor internal space affords exceptionally high dust-proofness. Moreover, owing to a design whereby the coil plate 211 is cooled from both sides, the coil plate 211, which represents the principal heat-radiating component, can be cooled effectively.

In cases in which, as in most motors, the coolant supply flow passages are constituted by a plurality of externally attached hoses, pipes, or the like, there is a risk that problems such as loose connecting portions or cracking pipes will occur due to vibration. If the pipes and connecting portions are strengthened in order to avoid such problems, weight will increase as well. In contrast, with the structure according to the present invention, wherein the coolant supply flow passages are centralized in the shaft-shaped center portion 100, the passages are simpler and more rigid, and are endowed with high resistance against vibration, dust, and the like.

Figure 8:
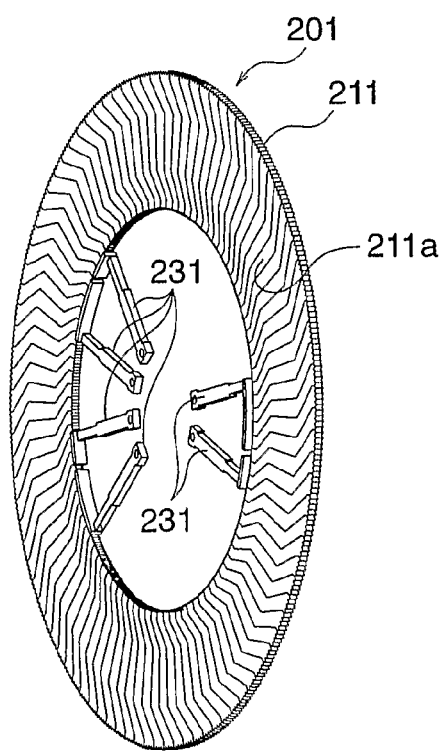
FIG. 8 is a perspective view of the stator coil.
Figure 9:
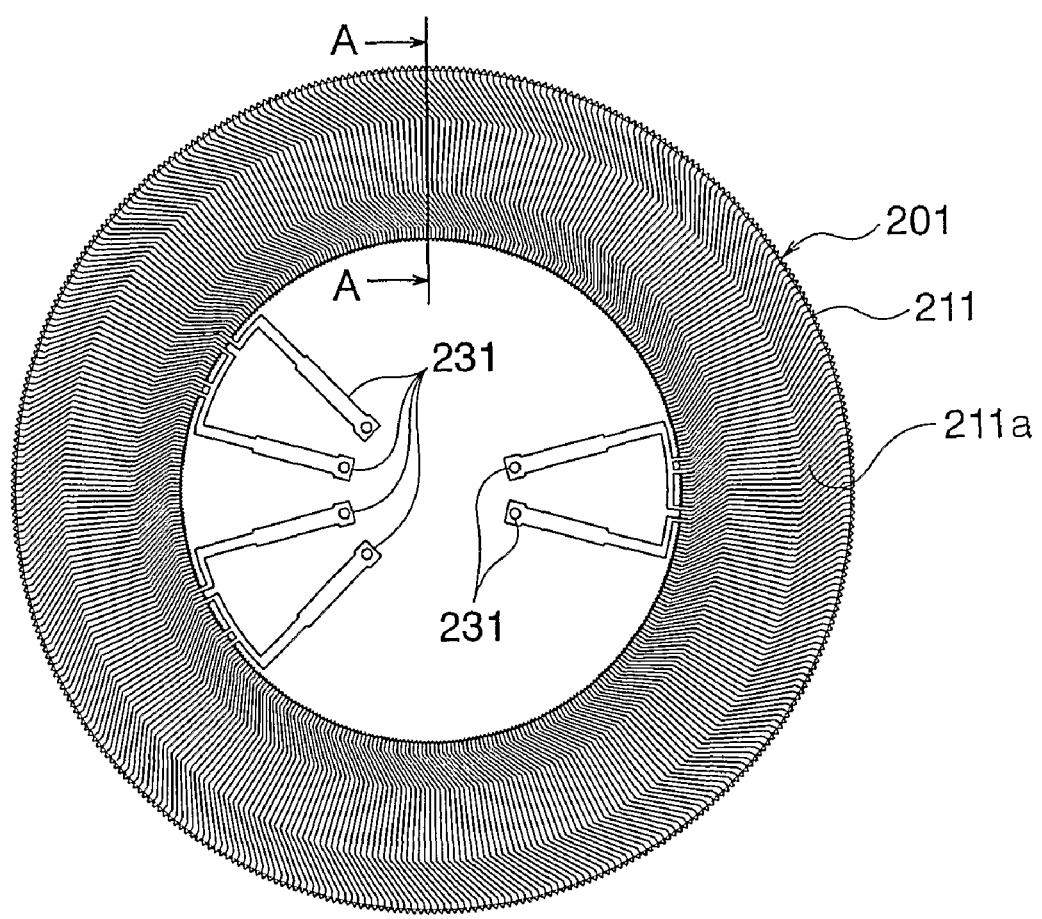
FIG. 9 is a front view of the stator coil.
Figure 10:
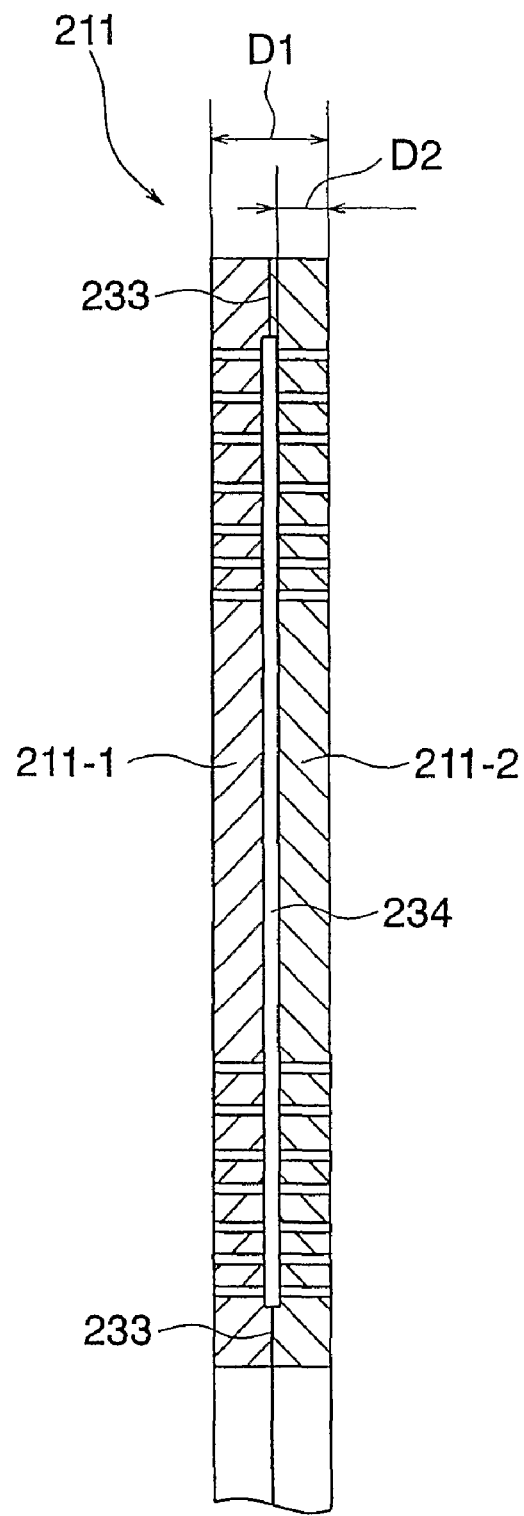
FIG. 10 is a sectional view taken along line A-A of FIG. 9.

Next, the stator coil 201 of the aforementioned stator 200 will be discussed in greater detail, with reference to FIGS. 8 through 10. FIG. 8 is a perspective view of only the coil plate 211 which makes up the stator coil 201; FIG. 9 is a front view; and FIG. 10 is a model depiction of a sectional view taken along line A-A in FIG. 9. In FIG. 10, the thickness of the coil plate 211 and a space 234 between first and second coil plate elements 211-1, 211-2 are shown exaggerated in order to aid in the understanding of the positional relationships of the space 234. For convenience in description, in FIG. 8 and the like, the insulators (to be discussed later) that are normally mounted on the external peripheral edge and internal peripheral edge of the stator coil 201 are shown removed.

The coil plate 211 has an annular (ring) shape of predetermined diametrical width. Pairs of coil bus bars 231 constituting the power supply terminals corresponding to each phase, namely the U phase, V phase, and W phase, are disposed along the internal peripheral edge, in three sets facing towards the center in the diametrical direction. However, placement of the coil bus bars 231 is not limited to that depicted in FIG. 8 and the like.

As mentioned earlier, the motor 10 is equipped with a power supply system 500 for supplying three-phase AC to the stator coil 201 of the stator 200. The interior of the shaft-shaped center portion 100 is used to accommodate the principal components of the power supply system 500. Electrical current supplied by an external power supply is fed to a power supply terminal 511a situated outside the aforementioned power supply bus bar module 510. Six connector terminals inside of power supply bus bar module are provided to the inside terminal portions of the shaft-shaped center portion 100. These six connector terminals are connected respectively to the six coil bus bars 231 mentioned earlier. By means of this wiring structure, the stator coil 201 is supplied with three-phase AC for generating a magnetic field. Since the space within the shaft-shaped center portion 100 is used to accommodate the wiring structure of the power supply system 500, the power supply system 500 of the motor 10 can be given a small and compact design.

The stator coil 201 constituted by the coil plate 211 is equipped with the coil winding patterns 211a; however, the shape is completely different from that of existing coils, and the component is not a "winding component" in the usual sense. This will be discussed in detail later. The stator coil 201 of the present embodiment uses a conductive metal sheet material such as copper. The metal sheet material used could be, for example, C1020 (oxygen free copper), C1100 (tough pitch copper), or other pure copper base material. In cases in which higher strength is needed, it would be possible to use high-conductivity metal alloys of the type used for semiconductor lead frames and the like, for example, Cu—Cr base, Cu—Zr base, Cu—Ag base, Cu—Fe base, Cu—Fe—P base, or Cu—Ni—Si base copper alloy. It is moreover acceptable to make the stator coil 201 from aluminum or aluminum alloy (duralumin and the like).

As shown in FIG. 10, the coil plate 211 is formed by diffusion bonding of the first coil plate element 211-1 and the second coil plate element 211-2. A line 233 denotes the bonding interface. The first coil plate element 211-1 and the second coil plate element 211-2 are of generally the same shape. The space 234 having a predetermined width in the diametrical direction forms in the medial portion in the thickness direction in the coil plate 211 when the first coil plate element 211-1 and the second coil plate element 211-2 are bonded together by diffusion bonding technology. The first coil plate element 211-1 and the second coil plate element 211-2 have wiring patterns for the purpose of forming the coil winding patterns 211a of the coil plate 211, respectively. In this embodiment, two, i.e., the first and second coil plate elements 211-1, 211-2 are employed, but the number of coil plate elements could instead be made three or more through appropriate design of the wiring pattern connection relationships.

In FIG. 10, the coil plate 211 has thickness D1 of 7.8 mm, for example, and the first and second coil plate elements 211-1, 211-2 have thickness D1 of 3.7 mm. Accordingly, the aforementioned space has a depth of about 0.4 mm.

In FIGS. 8 and 9, numerous fine wires depicted as angled line-shaped lines in the diametrical direction on the face of the coil plate 211, that is, the coil winding patterns 211a mentioned earlier, represent a coil wiring arrangement that corresponds to the coil winding.

Next, the method of fabricating the coil plate 211 will be discussed, accompanied by a detailed discussion of structures such as the coil winding patterns 211a of the coil plate 211.

Figure 11:
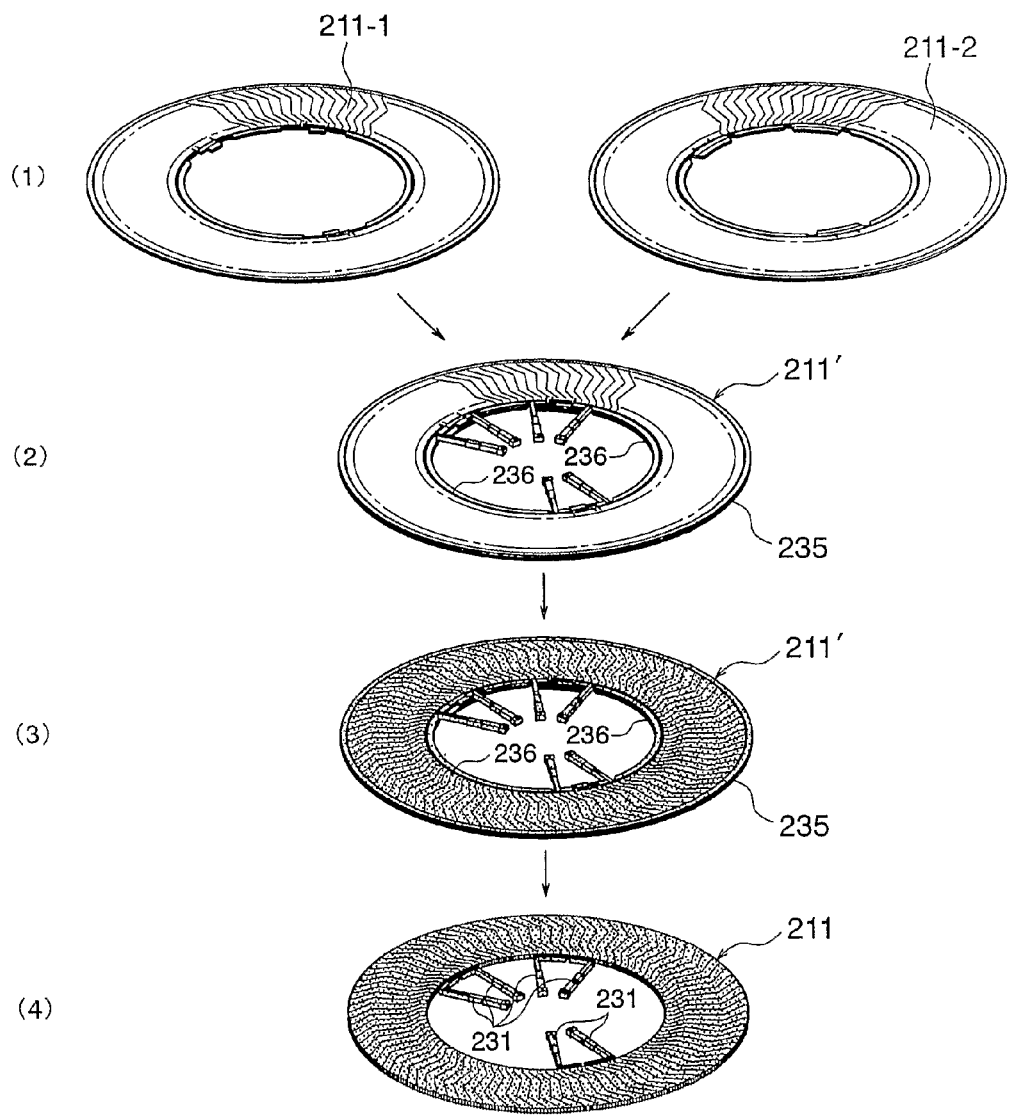
FIG. 11 is a process diagram showing the method of manufacture of the coil assembly according to the present invention.

FIG. 11 depicts the overall fabrication process of the coil plate 211, broken into four process steps (1) through (4).

The first process step (1) is a process for manufacturing the first coil plate element 211-1 and the second coil plate element 211-2. In preferred practice, copper or aluminum sheet material will be used in manufacturing the two coil plate elements. The first and second coil plate elements 211-1, 211-2 are provided with wiring patterns 241 by subjecting the respective copper sheets to an etching process or the like. The first and second coil plate elements 211-1, 211-2 have approximately the same shape; the wiring patterns 241 are substantially the reverse of one another.

The second process step (2) is a process for bonding the first and second coil plate elements 211-1, 211-2. The predetermined coil winding patterns 211a (coil groups) are achieved by positioning the first and second coil plate elements 211-1, 211-2 so that the element face each other, and bonding them by diffusion bonding or the like, with the wiring patterns 241 maintaining the corresponding phase relationships. Hereinafter, the as-bonded first and second coil plate elements 211-1, 211-2 shall be designated as the basic coil plate 211'. The use of an etching process in the manufacture of the first and second coil plate elements 211-1, 211-2 makes possible highly accurate machining of the coil plate 211 and large-volume production, thereby affording an inexpensive coil plate 211 having a high lamination factor.

The third process step (3) is a process for subjecting the basic coil plate 211' to an insulating process. The fine dots shown in FIG. 11 (3) represent an image of an insulating coating produced on the surface of the basic coil plate 211'.

The fourth process step (4) is a process for removing the coil bundle support portions of the basic coil plate 211' that has undergone the insulating process, and completing the coil plate 211. Specifically, the coil bundle support members are an external peripheral edge support member 235 and an internal peripheral edge support member 236 of the basic coil plate 211'. The coil bus bars 231 of copper or aluminum are prepared separately, and after the coil plate elements 211-1, 211-2 are bonded, the six coil bus bars 231 are bonded at the predetermined locations by diffusion bonding, thermocompression bonding, soldering, or the like, producing the condition of FIG. 11 (2). Subsequently, the insulating process of the third process step (3) and the support member removal process of the fourth process step (4) are carried out.

Next, the specifics of the first to fourth processes (1) to (4) will be described.

First, the first and second coil plate elements 211-1, 211-2 will be discussed with reference to FIGS. 12 and 13. The first coil plate element 211-1 and the second coil plate element 211-2 are the reverse of one another but have generally identical shape and structure; therefore, only the first coil plate element 211-1 will be discussed here.

Figure 12:
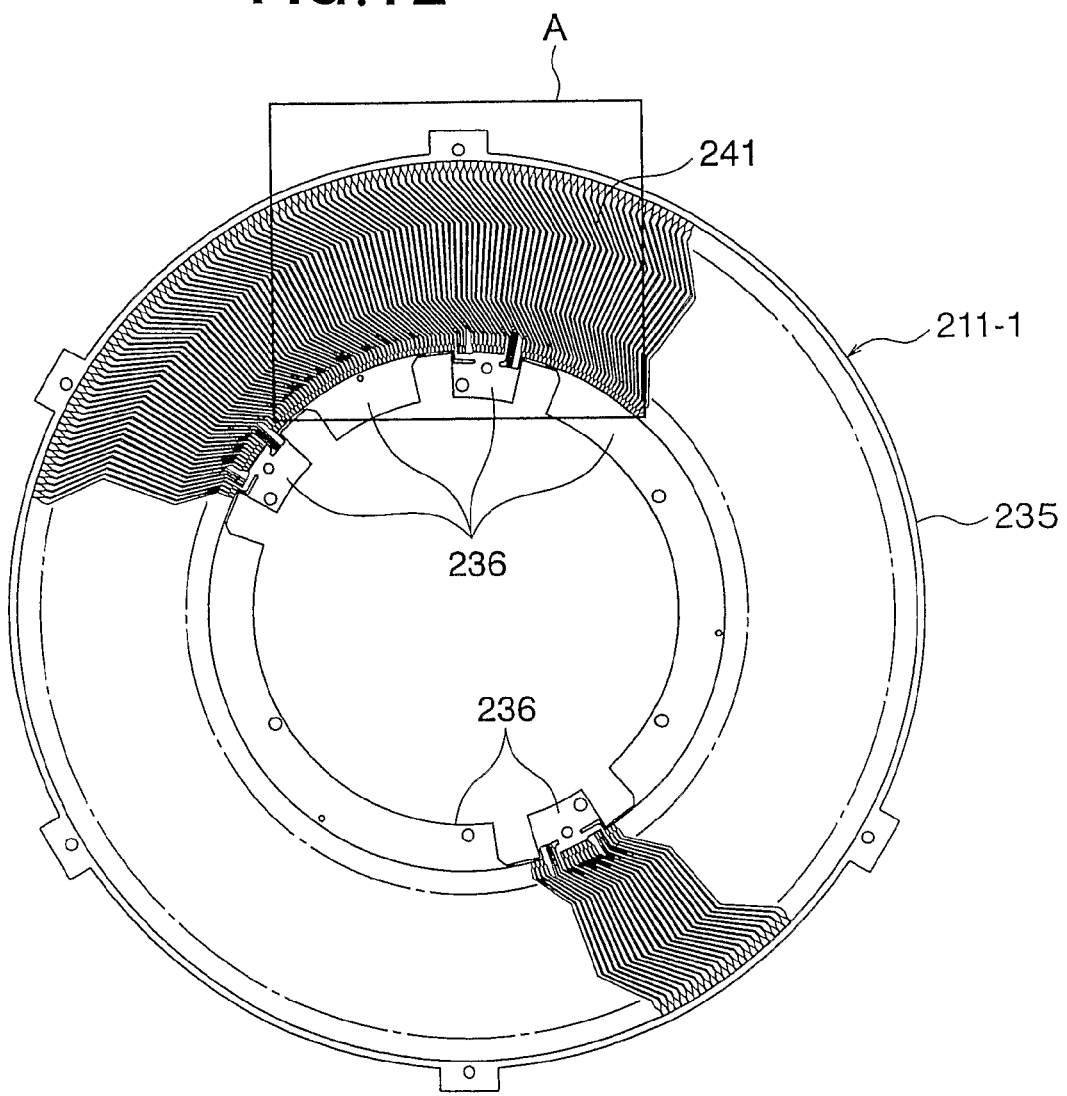
FIG. 12 is a front view showing the basic components of the first stator coil in a first process.

FIG. 12 is a front view showing the first coil plate element 211-1; and FIG. 13 is an enlarged view depicting an enlargement of the rectangular area A in FIG. 12. In FIGS. 12 and 13, the shape and structure of the first coil plate element 211-1 are shown with relatively high accuracy.

As shown in FIG. 12, the first coil plate element 211-1 has an annular planar shape. The plate thickness of the first coil plate element 211-1; is 3.7 mm, for example. The external peripheral edge support member 235 and the internal peripheral edge support member 236 are formed respectively at the external peripheral edge and internal peripheral edge of the first coil plate element 211-1. The external peripheral edge support member 235 and the internal peripheral edge support member 236 support the wiring patterns 241 at the external peripheral edge and internal peripheral edge, respectively.

As shown in enlarged view in FIG. 13, numerous coil segments 241a shaped as angled lines are formed over the entirety of an annular region in which the wiring patterns 241 are formed. The angled line-shaped coil segments 241a together constitute the coil bundle. The individual angled line-shaped coil segments 241a are supported by the external peripheral edge support member 235 and the internal peripheral edge support member 236. Slits 242 are formed between adjacent angled line-shaped coil segments 241a. The width of the slits 242 is 0.2 mm, for example.

In the present embodiment, the width of the slits 242 is constant. In order to achieve this, the angled line-shaped coil segments 241a have a greater circumferential width at the external peripheral side and a smaller circumferential width at the internal peripheral side. In cases in which the first and second coil plate elements 211-1, 211-2 are manufactured from copper sheet by etching or wire cutting or the like, machining is easier in cases in which the width of the slits 242 is constant. However, an arrangement whereby the width of the angled line-shaped coil segments 241a is constant, and the slits 242 have a greater circumferential width at the external peripheral side and a smaller circumferential width at the internal peripheral side, is also acceptable.

In cases in which the angled line-shaped coil segments 241a constituting the conductors have a constant width in the circumferential direction, the conductor cross sectional area of the angled line-shaped coil segments 241a will be constant regardless of the location of the angled line-shaped coil segments 241a in the diametrical direction, and thus variability in localized heat emission due to uneven resistance will be avoided.

As shown in FIG. 13, the angled line-shaped coil segments 241a include a bonded portion 241b arranged facing in the direction of the center of the first coil plate element 211-1, a center direction straight portion 241d, a bonded portion 241f, and diagonal portions 241c, 241e arranged on the diagonal.

The bonded portions 241b, 241f of the first coil plate element 211-1 are portions bonded with the corresponding bonded portions 241b, 241f of the second coil plate element 211-2, and may be relatively short, provided that length is sufficient to enable this connection.

The diagonal portions 241c, 241e are arranged on the diagonal inclined by a predetermined angle from the center direction, so as to constitute a coil loop when the bonded portions 241b, 241f are bonded. The center direction straight portion 241d (medial portion) is perpendicular to the magnetic flux generated in the coil plate 211, and is preferably made as long as possible since this is the portion that contributes primarily to the generation of torque by the motor 10. The lengths of the diagonal portions 241c, 241e and of the center direction straight portion 241d are determined appropriately depending on the size of the coil plate 211, the number of the angled line-shaped coil segments 241a, the number of phases, and the like.

The shape of the external peripheral edge support member 235 and the internal peripheral edge support member 236 constituting the coil bundle support portion is not limited to that illustrated in FIGS. 12 and 13, and any shape could be employed.

In the first process step (1), the first and second coil plate elements 211-1, 211-2 are manufactured. The first coil plate element 211-1 assumes the form of a copper sheet having a thickness of 3.7 mm, and is formed by subjecting a thinner copper sheet to etching and diffusion bonding, for example. In the present embodiment, extremely thin copper sheeting with a thickness of 0.1 mm is subjected to an etching process to produce a basic component 221-1' furnished with wiring patterns 241 (this corresponds to the thin metal sheet recited in the claims), and 37 layers of this basic component 221-1' are stacked and integrated through diffusion bonding to produce the first coil plate element 211-1. The smaller the slit width between the wiring patterns 241, the higher the lamination ratio of the coil plate 211 (equal to the proportion of copper based on the total volume of coil plate 211), and the lower the resistance of the stator coil 201 will be. However, a smaller slit width also means a smaller amount of etching of the copper sheet in the depth direction, making it necessary to stack up a correspondingly greater number of copper sheets. Specifically, the number of stacked copper sheets will be determined in consideration of the etching technology, the slit width, and the final thickness of a single coil plate 211. Thermocompression bonding or other bonding method could be employed in place of diffusion bonding.

The method of forming slits by etching as discussed above is appropriate in cases in which narrow slits having slit width of 0.5 mm or smaller are to be formed; however, in cases in which forming wider slits having slit widths of between about 0.5 mm and 1 mm, it will be effective to employ known wire cutting, laser cutting, notch pressing, or the like. In this case it will not be necessary to manufacture the basic components 221-1' from thin copper sheeting and stack up a plurality of these to form a single coil plate element 211-1 as described previously; instead, the slits 242 (and as a result the wiring patterns 241) can be formed by directly subjecting the coil plate element 211-1 having the final thickness to the machining process.

The first coil plate element 211-1 is manufactured in the manner described above, and the second coil plate element 211-2 is manufactured in the same manner.

Next, the second process step (2) will be described with reference to FIGS. 14 through 18.

In the second process step (2), the first and second coil plate elements 211-1, 211-2 of approximately the same shape and having wiring patterns that are substantially the reverse of one another are juxtaposed and bonded with one another. At this time, the coil plate elements are bonded so that their wiring patterns 241 maintain the corresponding phase relationships, thereby completing the basic coil plate 211' furnished with the predetermined coil loops. FIG. 14 is a perspective view depicting the first and second coil plate elements 211-1, 211-2 immediately prior to being bonded.

Figure 15:
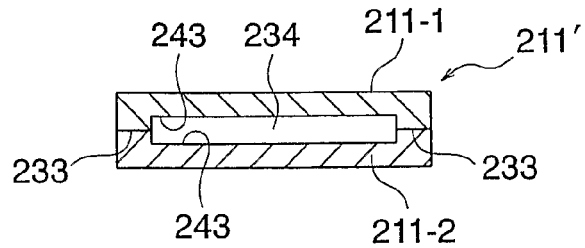
FIG. 15 is a sectional view taken along line B-B of FIG. 14.

In FIG. 14, the plate-shaped annular first coil plate element 211-1 and the second coil plate element 211-2 are positioned, juxtaposed, and bonded together by diffusion bonding technology. The basic coil plate 211' is formed by the bonding of the first coil plate element 211-1 and second coil plate element 211-2. FIG. 15 is a sectional view taken along line B-B, depicting in model form the bonded first and second coil plate elements 211-1, 211-2 shown in FIG. 14. In FIG. 15 (and in FIGS. 16 through 18 as well), the first and second coil plate elements 211-1, 211-2 are respectively depicted in simplified form. In FIG. 15, the thickness direction (and particularly the depth of the space 234) is shown exaggerated in the same manner as in FIG. 10. In FIGS. 14 and 15, since the purpose is to illustrate the bonding relationship and bonding structure of the two elements of the first coil plate element 211-1 and the second coil plate element 211-2, the illustration is provided with the level of detail sufficient for understanding the bonding relationship and structure, while the shape and structure of the basic component as such are shown only schematically.

The bonding line 233 in FIG. 15 indicates the bonded portion produced by diffusion bonding technology. In FIG. 10 and FIG. 15, the slit-shaped space 234 has been formed between the first coil plate element 211-1 and the second coil plate element 211-2. This is because, in the first process step (1) discussed earlier, a recess 243 was pre-formed both on the first coil plate element 211-1 and on the second coil plate element 211-2, in the portions thereof that constitute the opposing faces when bonded. This recess 243 can be formed, for example, by performing etching or an electrical discharge machining process on the first and second coil plate elements 211-1, 211-2.

Figure 16:
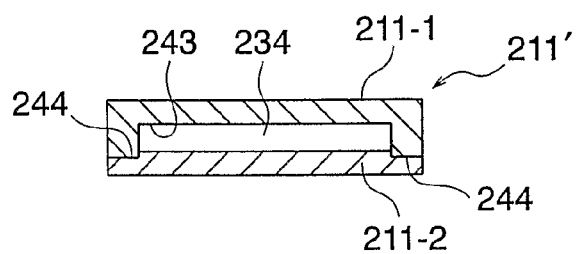
FIG. 16 is a sectional view similar to FIG. 15, illustrating a modified embodiment of the present invention.

Bonding of the first and second coil plate elements 211-1, 211-2 is not limited to diffusion bonding, and it would be possible to use some other method such as soldering. FIG. 16 depicts an embodiment in which a known solder, which is a conductor, is used for bonding. In this embodiment, in order to prevent the solder from flowing into the slit-shaped space 234 from the bonded portion, the morphology of the bonded portion may be modified as shown in FIG. 16. Specifically, in the first coil plate element 211-1, the recess 243 is formed with greater depth, while in the other second coil plate element 211-2, the recess 243 is removed to produce a flat [profile] overall, and a shoulder portion 244 is formed to serve as the bonding portion. In the case of the structure depicted in FIG. 16, the shoulder portion 244 of the second coil plate element 211-2 positioned on the lower side, and the recess 243 of the first coil plate element 211-1 positioned on the upper side, can be formed, for example, by direct etching or electrical discharge machining of a single copper sheet having [the required] thickness. The "solder," which is a conductor, has a certain amount of flowability during bonding of the first and second coil plate elements 211-1, 211-2. If this "solder" should penetrate into the space 234 between the first and second coil plate elements 211-1, 211-2, insulation between adjacent coil wiring patterns will no longer be maintained. To prevent this from happening, a pillbox-shaped mating structure like that shown in FIG. 16 is employed so that the "solder" will not flow into the slit-shaped space 234.

Instead of forming the recesses 243 shown in FIG. 15, an intermediate plate could be interposed between the first and second coil plate elements 211-1, 211-2 when the elements are bonded together.

Figure 17:
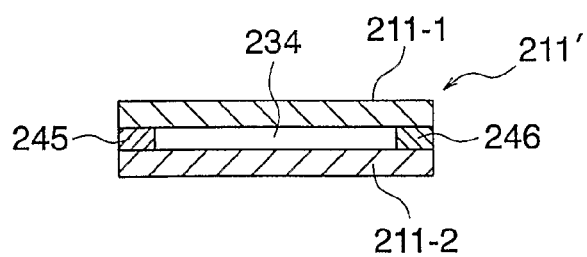
FIG. 17 is a sectional view similar to FIG. 15, depicting another modified embodiment.
Figure 18:
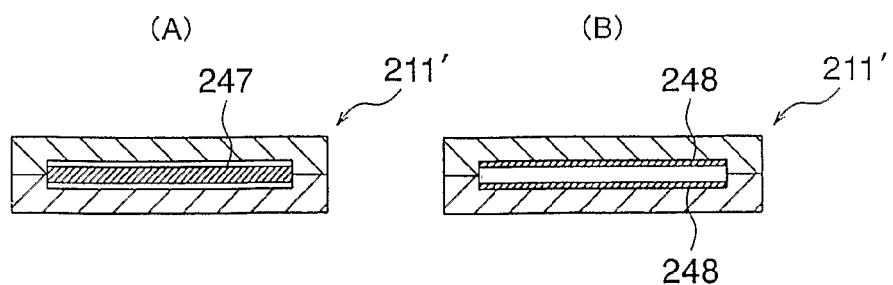
FIG. 18 is a sectional view similar to FIG. 15, depicting still another modified embodiment of the present invention.

FIG. 17 is a simplified depiction in cross section of the first and second coil plate elements 211-1, 211-2 after being diffusion bonded with intermediate plates 245, 246 interposed between them. Diffusion bonding (or thermocompression bonding) of the positioned members is carried out, and the intermediate plates 245, 246 maintain the space 234. Slits 242 corresponding to the wiring patterns 241 of the first and second coil plate elements 211-1, 211-2 are formed for the intermediate plates 245, 246 as well, so as to complete the final coil winding patterns 211*a* (coil loops). The material of the intermediate plates 245, 246 is the same as that used for the first and second coil plate elements 211-1, 211-2. In cases in which this structure is employed, the recesses 243 are not formed, and diffusion bonding is performed only at the required locations so that the coil winding patterns 211*a* are completed by means of the angled line-shaped coil segments 241*a* that make up the first and second coil plate elements 211-1, 211-2.

The intermediate plates 245, 246 are employed because it is usually only possible to produce flat plate members in the event that "etching+diffusion bonding" is employed in the first step (1) for fabricating the first and second coil plate elements 211-1, 211-2.

In the aforementioned [process], when the first and second coil plate elements 211-1, 211-2 are bonded and integrated, in some instances, due to the high bonding temperature and the fact that the material is copper, the first coil plate element 211-1 positioned on the upper side may sink slightly under its own weight so that the gap in the center portion of the slit-shaped space 234 constricts. In order to avoid this, a ceramic sheet 247 may be disposed between the two coil plate elements as shown in FIG. 18(A), or a ceramic spray coating 248 could be provided to the bottom surface that forms the recesses 243 of the first and second coil plate elements 211-1, 211-2, as shown in FIG. 18(B).

In the present embodiment, the power supply coil bus bars 231 are provided as separate components in the second process step (2), as shown in FIG. 11. Here, in the first process step (1), the coil bus bars 231 could be formed by patterning at the same time together with the first and second coil plate elements 211-1, 211-2. In this case, bonding of the coil bus bars 231 will take place in conjunction with the first and second coil plate elements 211-1, 211-2 in the second process step (2).

The external peripheral edge support member 235 and an internal peripheral edge support member 236 are respectively bonded to the first and second coil plate elements 211-1, 211-2 (see FIG. 13). Subsequent to the bonding process, the external peripheral edge support member 235 and the internal peripheral edge support member 236 will respectively serve as the external peripheral edge support member 235 and the internal peripheral edge support member 236 of the basic coil plate 211'. The apertured projecting portions respectively formed on the external peripheral edge support member 235 and the internal peripheral edge support member 236 are used to position and grasp the plate members during the etching process, stacking, and the like.

Figure 19A:
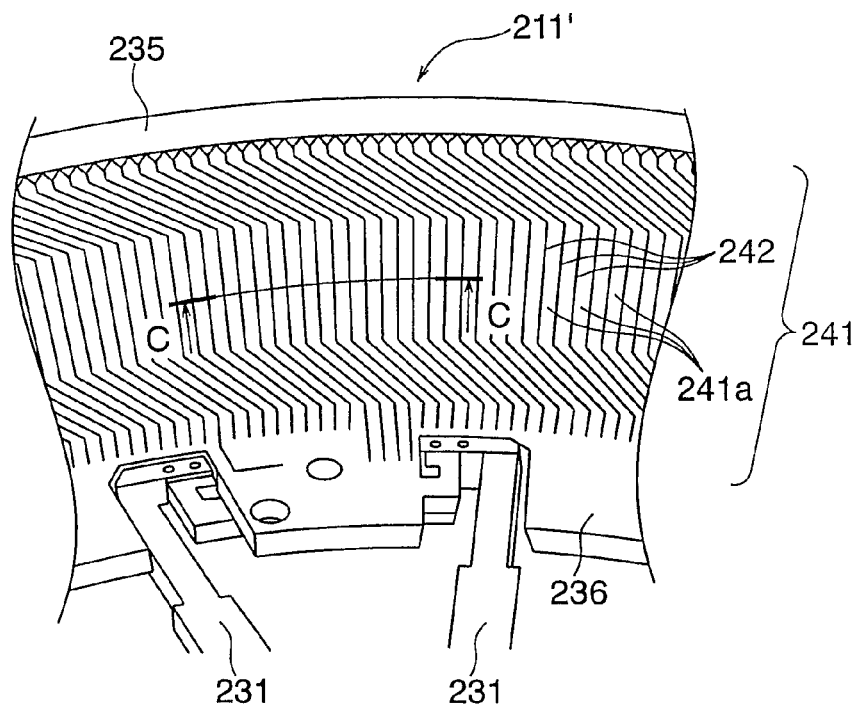
FIG. 19A is an enlarged front view of the principal basic components of the stator coil, illustrating a third process.

Next, the third process step (3) will be described with reference to FIG. 19A, FIG. 19B, and FIG. 20. FIG. 19A is a fragmentary enlarged view of the basic coil plate 211' shown in (3) of FIG. 11; and FIG. 19B is an enlarged model depiction of a section taken along line C-C.

Figure 19B:
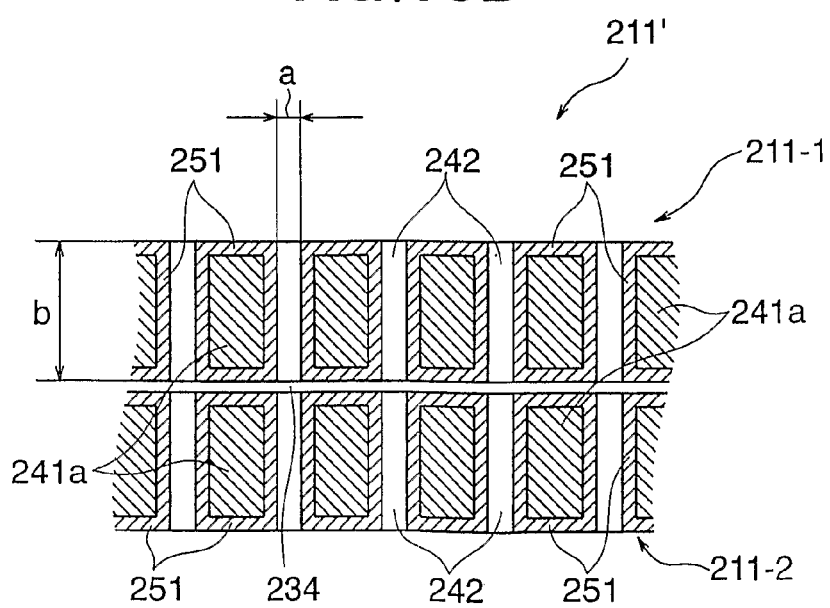
FIG. 19B is a longitudinal sectional view taken along line C-C of FIG. 19A.

In FIG. 19B, since the purpose is to illustrate the surface insulating process of the basic coil plate 211', the illustration has been simplified to aid understanding of the specifics of the process, and depicts only the basic elements of the shape and structure of the basic coil plate 211' as such.

In FIG. 19B, the upper layer is the first coil plate element 211-1, and the lower layer is the second coil plate element 211-2.

The basic coil plate 211' having the structure described above is coated over the entire exterior face and the entire interior face thereof by an insulating film 251. In this embodiment, the insulating film 251 is a polyimide film, for example. The insulating film 251 may instead be some other organic or inorganic coating (e.g., poly-para-xylene, DLC: diamond-like carbon, and the like). The coating formed on the interior surfaces by the insulating film 251 is produced by introducing the coating material into the interior of the basic coil plate 211' from the slits 242, and forming a coating film. In the present embodiment, the width of the slits 242 is on the order of 0.2 mm; sufficient coating of interior surfaces can be attained with a slit width of about this size.

In this embodiment, a "deposition polymerization polyimide coating" method is employed in the surface insulating process. It is also possible to carry out coating by electrodeposition as the surface insulating process.

By employing an etching process or the like during manufacture of the first and second coil plate elements 211-1, 211-2, it is possible to form the slits 242 with high fineness and accuracy; and by employing a stacked structure of a plurality of basic components 211-1', 211-2', the slits 242 are endowed with a very high aspect ratio. Specifically, the value of b/a in FIG. 19B will be very high (in the present embodiment, on the order of 20). Thus, the conductor lamination factor of the stator coil 201 may be improved, and lower resistance, reduced copper loss of the stator coil 201, and improved output efficiency of the motor 10 may be realized as a result.

Figure 20:
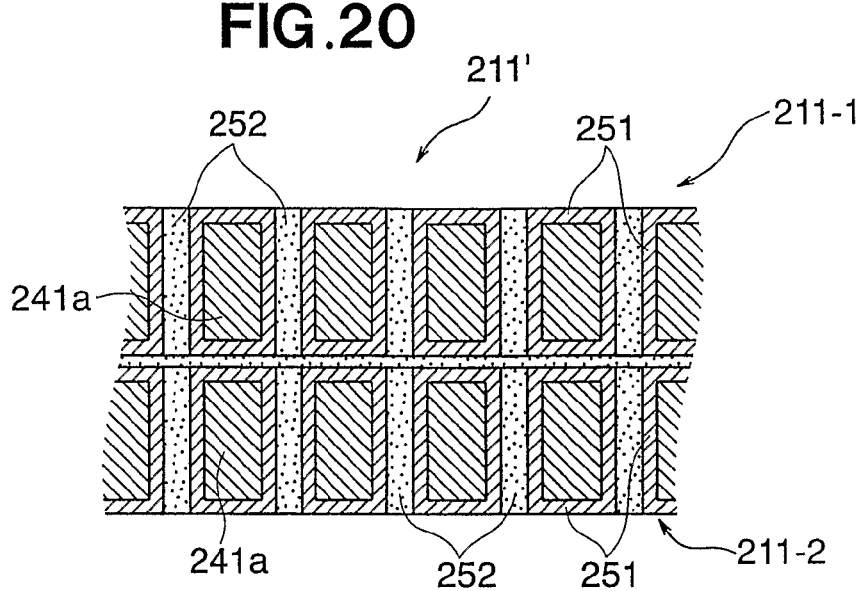
FIG. 20 is a longitudinal sectional view showing another modified embodiment of the basic components of the stator coil in the third process.

FIG. 20 illustrates another embodiment of the third process step (3) and is a model diagram depicting an enlarged fragmentary cross section of the basic coil plate 211' in the same manner as FIG. 19B. In FIG. 20, elements which are substantially identical to elements that have been discussed in FIG. 19B are assigned identical symbols and will not be discussed. A feature of the embodiment shown in FIG. 20 is that, upon coating with the insulating film 251, an insulating resin 252 is injected or impregnated by way of an insulating filler material into all remaining gaps, and provided as a mold.

The insulating material used for the filling process of the slits 242 and the space 234 is a thermosetting resin, thermoplastic resin, ultraviolet curing resin, or other material that exhibits high flowability during filling, and that develops adequate strength upon curing. Examples are epoxy, phenol, DPA (diallyl phthalate), polyester, polyimide, polyamide, polyamide-imide, PBT (polybutylene terephthalate), PET (polyethylene terephthalate), PPS (polyphenyl sulfide), LCP (liquid crystal polymer), silicone (silicone resin), and the like. In cases in which adequate insulating properties can be assured simply by filling the slits 242 and the space 234 with these molding materials (filler materials), surface coating with the insulating film 252 will not be necessary.

Figure 21:
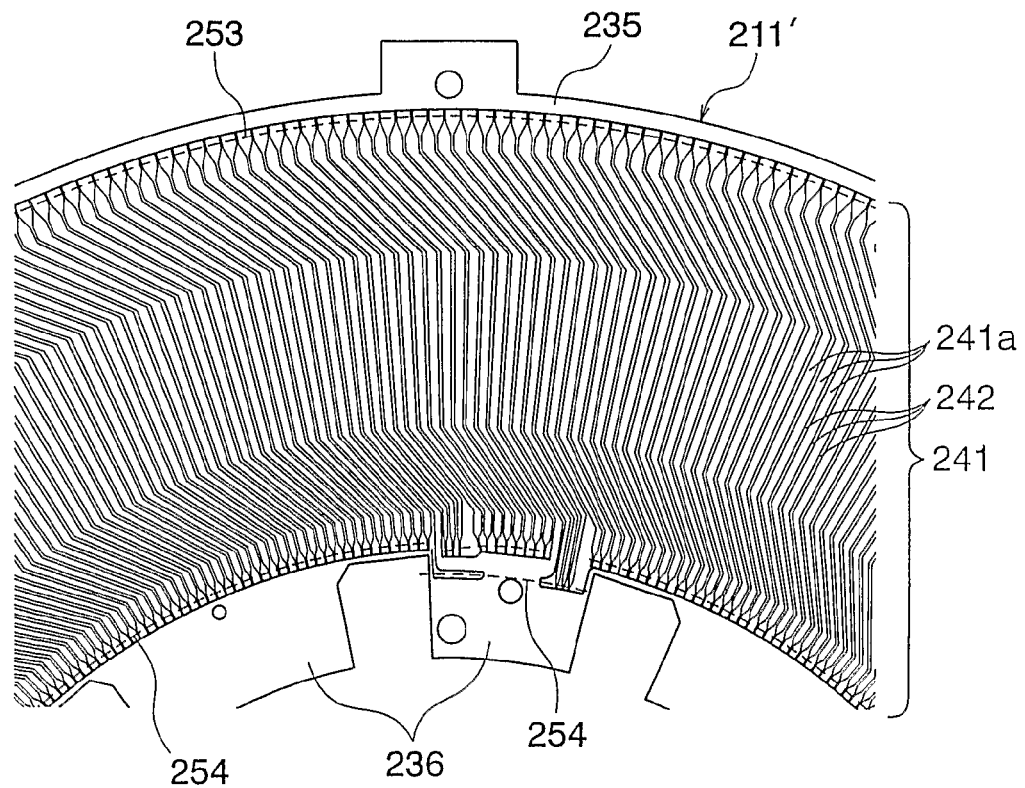
FIG. 21 is a partial front view of the basic components of the stator coil, showing disconnected wires in a fourth process.

Next, the fourth process step (4) will be described with reference to FIG. 21. FIG. 21 is basically similar to FIG. 13.

In FIG. 21, cutting lines 253, 254 for cutting away the external peripheral edge support member 235 and the internal peripheral edge support member 236 are shown. The arrangement of other details is similar to FIG. 13.

The external peripheral edge support member 235 for supporting the coil bundle is removed by cutting along the cutting line 253 at the external peripheral edge indicated by the broken line. The internal peripheral edge support member 236 for supporting the coil bundle is removed by cutting along the cutting line 254 at the internal peripheral edge indicated by the broken line. The coil plate 211 is completed thereby. When the coil plate 211 is completed, coil loops are formed individually by the numerous angled line-shaped coil segments 241a present in the wiring patterns 241.

The means for carrying out the aforementioned cutting process may be a wire cutting electrical discharge machining apparatus, a water jet machining apparatus, a contour machine, or other cutting machining apparatus, as well as a press punch machine or the like.

By cutting in the fourth process step (4), the insulating film 251 will peel at the cut section; however, an insulating state is ensured by attaching insulators (insulating frames), as discussed later.

Next, the structure of the coil winding patterns 211a (coil structure) in the coil plate 211 fabricated in the above manner will be described with reference to FIGS. 22A to 24.

Figure 22A:
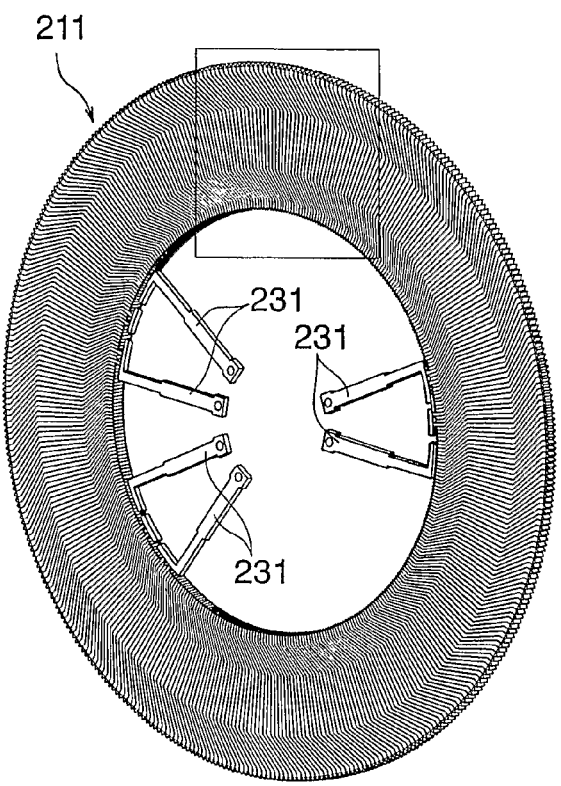
FIG. 22A is a perspective view depicting the completed stator coil.
Figure 22B:
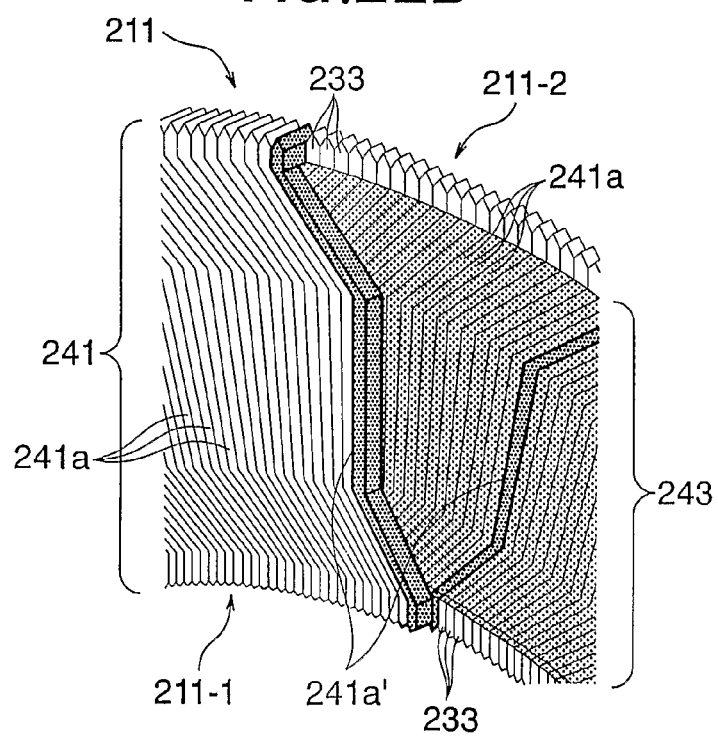
FIG. 22B is a perspective view showing on an enlarged scale the area within the square frame in FIG. 22A.
Figure 23A:
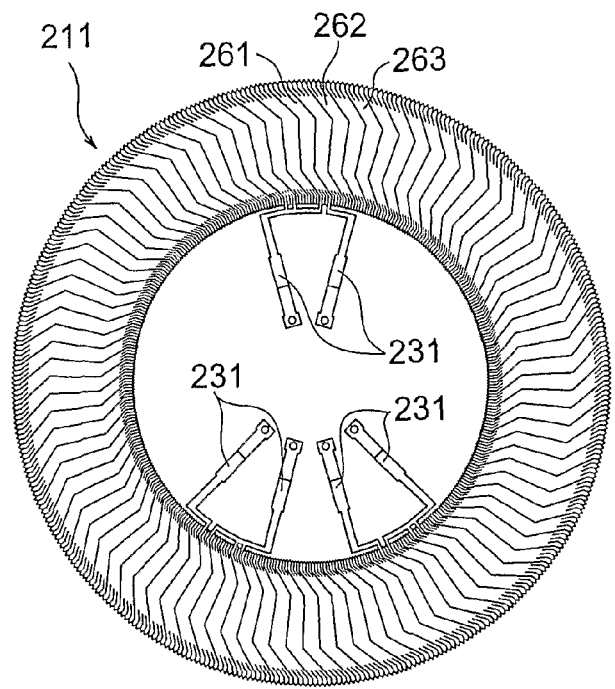
FIG. 23A is a front view showing a relationship of the three coil loops in the completed stator coil.

FIG. 22A is a perspective view depicting the completed coil plate 211. FIG. 22B is a perspective view depicting an enlargement of the area within the square frame in FIG. 22A. FIG. 23A is a front view showing placement relationships among three phase coil loops 261, 262, 263 that make up the coil plate 211. The coil winding patterns 211a of FIG. 8 are composed of the coil loops 261, 262, 263.

In FIG. 22B, in the right half of the drawing, the first coil plate element 211-1 is shown removed, so as to facilitate understanding of the connection relationship of the first coil plate element 211-1 and the second coil plate element 211-2.

As shown in FIG. 22B, the wiring patterns 241 of the first coil plate element 211-1 and the wiring patterns 241 of the second coil plate element 211-2 are the reverse of each another. The multiple angled line-shaped coil segments 241a that make up each wiring pattern 241 have basically the same shape except for the power supply terminals (described later) that connect to the coil bus bars 231, and are arrayed at identical intervals in the circumferential direction. As mentioned previously, adjacent angled line-shaped coil segments 241a are insulated from one another. The angled line-shaped coil segments 241a are also bonded, at the bonding interfaces 233 at the internal peripheral edge and the external peripheral edge (portions 241b, 241f in FIG. 13), to the corresponding angled line-shaped coil segments 241a on the opposite side. In FIG. 22B, the form of a typical angled line-shaped coil segment 241a' is shown. In FIG. 22B, the hatched area 243 is the area where the recess 243 shown in FIG. 15 is formed.

Bonding together of the angled line-shaped coil segments 241a completes the coil loops 261, 262, 263 that have a flattened spiral shape and traverse alternately between the first coil plate 211-1 side and the second coil plate element 211-2 side.

As shown in FIG. 23A, the U phase coil loop 261, the V phase coil loop 262, and the W phase coil loop 263 having an identical shape and constitution are arranged so that the phase coil loops have between them a phase difference equal to an electrical angle of $(2/3)\cdot\pi$(rad), where one pole pair of the rotor magnetic poles equals an electrical angle of $2\pi$(rad), in the same manner as commonly known three-phase windings.

Figure 23B:
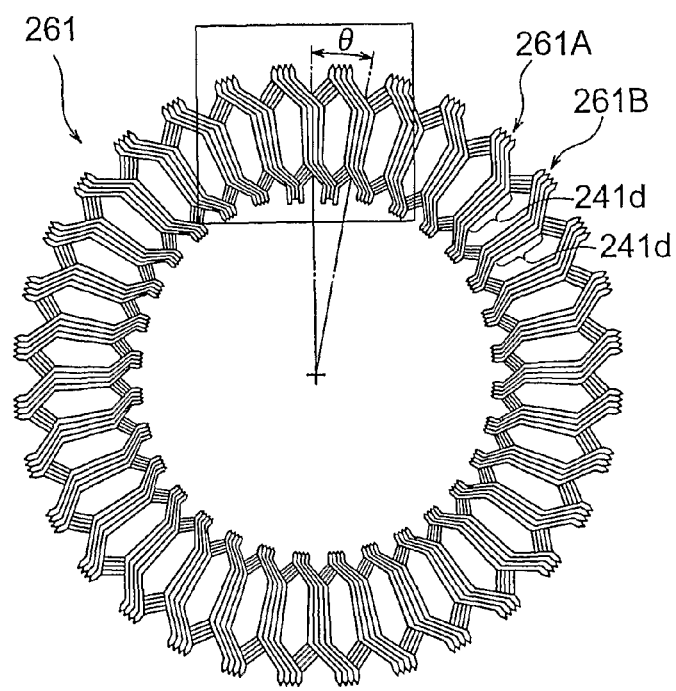
FIG. 23B is a front view showing a U-phase coil loop in the completed stator coil.

In order to facilitate understanding of the loop configuration, FIG. 23B depicts only the U phase coil loop 261 for a single phase among the three phase coil loops. In FIG. 23B, the coil bus bars 231 are shown removed. The coil loop 261 is composed of two coil loop elements, namely, a first coil loop element 261A and a second coil loop element 261B. The two coil loop elements 261A, 261B are identical in shape and are positioned with their phases offset in the circumferential direction by the equivalent of one pitch of the coil loop (corresponding to the phase angle $\theta$ in FIG. 23B). The center direction straight portions 241d of the four angled line-shaped coil segments 241a of the first coil loop element 261A, and the center direction straight portions 241d of the four angled line-shaped coil segments 241a of the second coil loop element 261B, are juxtaposed directly facing each other across the space 234.

Next, the U phase coil loop 261 will be discussed in detail.

Figure 24A:
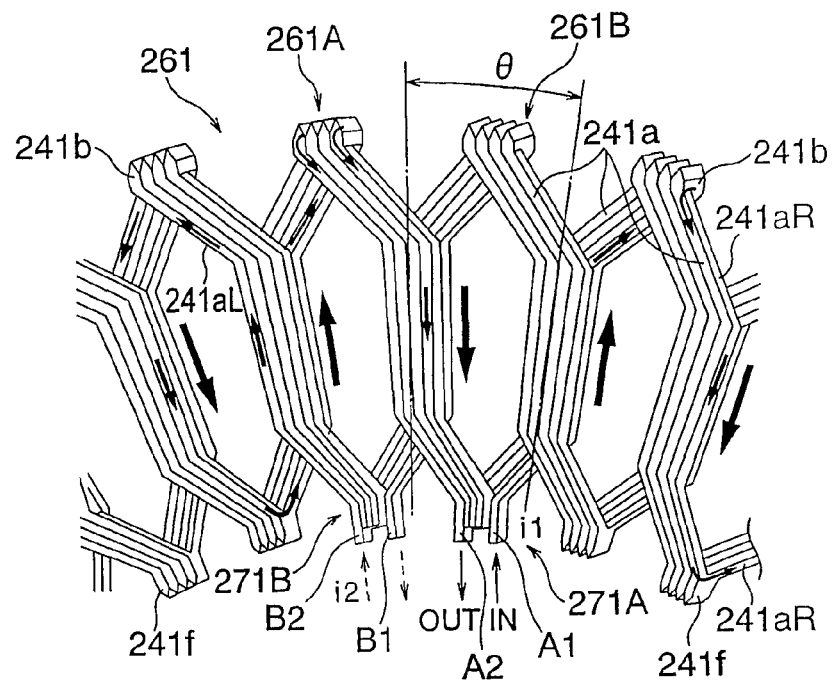
FIG. 24A is a perspective view showing on an enlarged scale the area within the square frame in FIG. 23B.
Figure 24B:
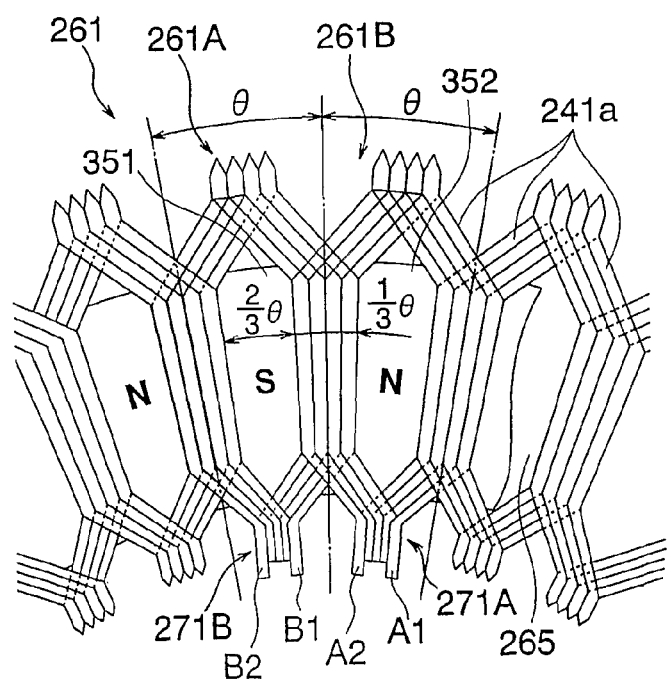
FIG. 24B is a partial front view of the coil loops, illustrating a relationship to the magnetic pole faces on the rotor side.

FIG. 24A is a perspective view depicting an enlargement of the area within the square frame in FIG. 23B. FIG. 24B is a fragmentary front view of the coil loop 261, and is intended to illustrate the relationship with the magnet pole faces on the rotor side.

FIGS. 24A and 24B also show a power supply terminal 271A of the first coil loop element 261A, and a power supply terminal 271B of the second coil loop element 261B at the internal peripheral edge. FIG. 24B depicts the phase relationship at the moment at which the magnet pole faces of the N poles and S poles formed by permanent magnets on the rotor (not shown) produce a maximum overlap relative to the coil loop 261.

The path of electrical current i1 flowing to a terminal A1 of the power supply terminal 271A will be discussed with reference to FIG. 24A.

First, the electrical current i1, which has flowed through the angled line-shaped coil segment 241a that includes the terminal A1, passes through the bonded portion 241b at the external peripheral side, and flows from the external peripheral side towards the internal peripheral side through the rightmost angled line-shaped coil segment 241aR, which is one of the four angled line-shaped coil segments 241a and makes up the initial turn. Then, passing through the bonded portion 241f at the internal peripheral side, [the current] flows from the internal peripheral side towards the external peripheral side through the rightmost angled line-shaped coil segment 241aR. The electrical current i1 flows sequentially over this pathway in the sequence "internal peripheral side"→"external peripheral side"→"internal peripheral side"→"external peripheral side," and the like, and completes a single cycle in the clockwise direction through the first coil loop element 261A, whereupon the electrical current i1 continues to flow to the second-from-right angled line-shaped coil segment 241a, which is situated adjacently left of the terminal A1 and constitutes the second turn. After circling through the second angled line-shaped coil segment 241a in the same manner as above, the electrical current i1 circles through the third and fourth angled line-shaped coil segments 241a, and finally out from a terminal A2 of the power supply terminal 271A.

Meanwhile, the electrical current i2, which has flowed to the terminal B2 of the power supply terminal 271B, passes through the bonded portion 241b at the external peripheral side, and flows from the external peripheral side towards the internal peripheral side through the leftmost angled line-shaped coil segment 241aL that makes up the initial turn. Then, passing through the bonded portion 241f at the internal peripheral side, [the current] flows from the internal peripheral side towards the external peripheral side through the leftmost angled line-shaped coil segment 241aL. The electrical current i2 flows sequentially over this pathway in the sequence "internal peripheral side"→"external peripheral side"→"internal peripheral side"→"external peripheral side," and the like, and completes a single cycle in the counterclockwise direction through the second coil loop element 261B, whereupon the electrical current i2 continues to flow to the second-from-left angled line-shaped coil segment 241a, which is situated adjacently right of the terminal B2 and constituting the second turn. After circling through the second angled line-shaped coil segment 241a in the same manner as above, the electrical current i2 circles through the third and fourth angled line-shaped coil segments 241a, and finally out from a terminal B1 of the power supply terminal 271B.

As will be apparent from the preceding description of the electrical current path, the first coil loop element 261A and the second coil loop element 261B have a coil pattern shaped as a so-called wave winding in plan view.

As indicated by the large arrows in FIG. 24A, when electrical current I1 is passing through the first coil loop element 261A and electrical current I2 is passing through the second coil loop element 261B, the direction of the currents I1, I2 flowing through the two coil loops in the diametrical direction will be the same. As a result, magnetic fields of identical polarity will be generated by the two coil loop elements, and the combined magnetic fields will supplement and strengthen one another.

The U phase coil loop 261 can be realized with two coil loop elements connected in series, assuming the terminal A1 is designated as the power supply input terminal, the terminal A1 and the terminal B2 are connected by a bus bar or the like, and the terminal B1 is designated as the power supply output terminal. The V phase coil loop 262 and the W phase coil loop 263 have the same shape and configuration as the U phase coil loop 261, differing only in terms of their placement within the coil plate 211, and will not be discussed in detail.

The phase angle $\theta$ will now be discussed.

As shown in FIG. 23B, the phase angle $\theta$ of the first coil loop element 261A and the second coil loop element 261B matches the respective phase angle in the circumferential direction of the S pole magnetic pole face 351 and the N pole magnetic pole face 352, which are formed by the permanent magnets positioned on the rotor (not shown). Thus, at the moment in time that the first coil loop element 261A is situated facing an S pole, the second coil loop element 261B will be situated facing an N pole. Specifically, the two coil loop elements 261A, 261B are coil loop elements having reverse polarity and a mutual phase difference that constitutes an electrical angle of π (rad).

Furthermore, as shown in FIG. 24B, the range occupied in the circumferential direction by the U phase coil loop 261 is a phase angle range that is ⅓ the magnetic pole pitch angle θ, while the V phase coil loop 262 and the W phase coil loop 263 have the positional relationship discussed previously in FIG. 23A and cover the remaining ⅔ phase angle range, together forming the coil plate 211. FIG. 24B is intended to illustrate a relationships that involves the magnetic pole faces on the rotor side. For convenience, the width of the angled line-shaped coil segments 241a in the circumferential direction and the width of the phase angle are depicted in simplified or exaggerated form.

In the present embodiment, as shown in FIG. 24B, a single coil loop element has a wave winding-shaped configuration furnished with four turns per pole pair, and a series connection of both of the coil loops in the above-described manner produces an arrangement of eight turns per phase or per pole. The number of turns was determined in consideration of the output and phase current value of the motor 10 of the present invention, the coil phase resistance, and the effective magnetic flux level so as to minimize the copper loss in the coils and to avoid the need for voltage to exceed the upper limit of the power supply voltage due to an excessively large number of turns of the coil. It is apparent that the optimal number of turns will vary if output requirements for torque, speed, and the like, or for required parameters such as motor dimensions, are modified. The coil loops 261A, 261B of the present embodiment form a hexagonal area 265 facing the magnetic pole face, and a magnetic flux passing through this area constitutes the effective magnetic flux for motor output. Accordingly, it will be desirable to appropriately determine the various sizes and angles in the hexagonal area 265 in such a way as to maximize the amount of magnetic flux passing through this area and to minimize the phase resistance of the coil.

Figure 25:
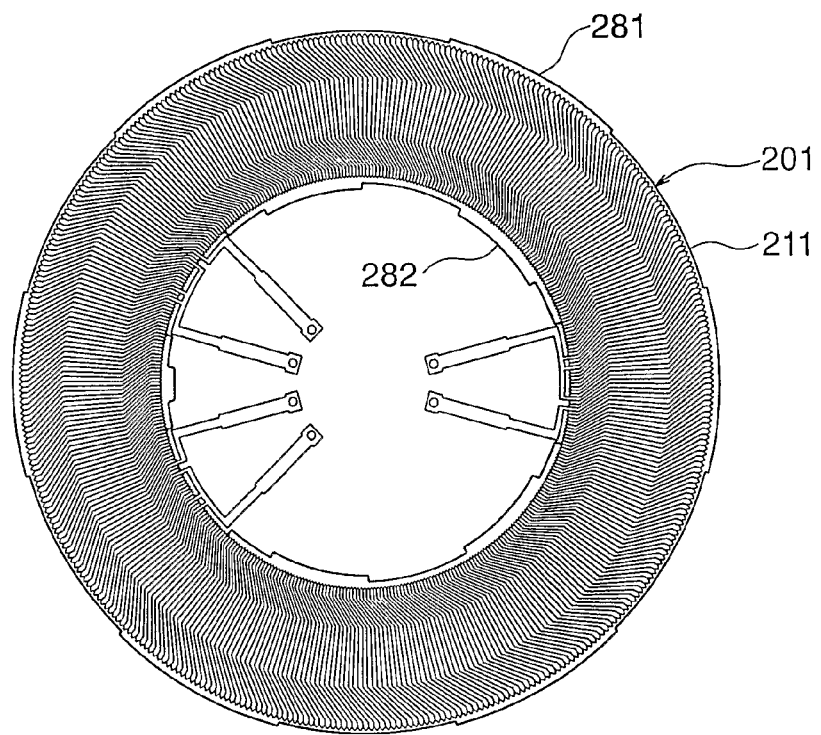
FIG. 25 is a front view of the stator coil with insulators attached.
Figure 26:
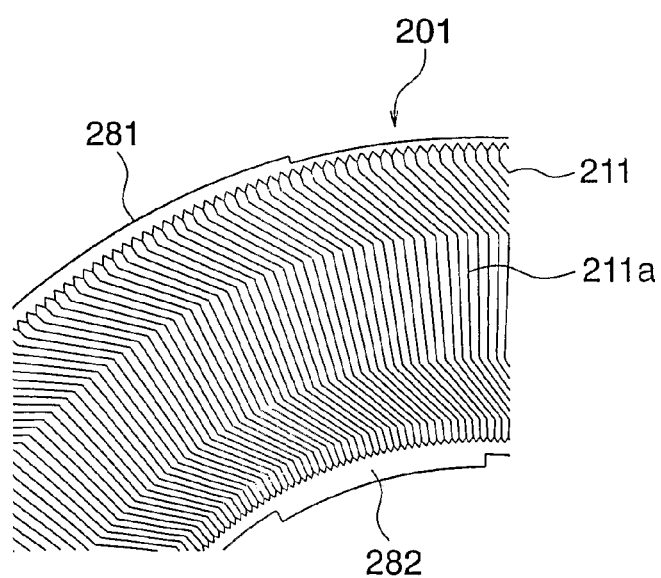
FIG. 26 is an enlarged fragmentary view of FIG. 25.

Finally, the insulators attached to the external peripheral edge and the internal peripheral edge of the completed coil plate 211 will be described with reference to FIGS. 25 and 26. FIG. 25 is a front view of the coil plate 211, and FIG. 26 is a fragmentary enlarged sectional view of FIG. 25.

281 is an insulator affixed to the external peripheral edge of the coil plate 211, and 282 is an insulator affixed to the internal peripheral edge of the coil plate 211. The insulators 281, 282, which are formed as single ring-shape members, are fabricated of rigid members having insulating properties (e.g., nylon that contains glass fibers), and are furnished at the peripheral edges with triangularly shaped lands and grooves that mesh securely with the coil plate 211. The coil plate 211 disposed within the stator is held by the insulators 281, 282, which are disposed so as to not move in opposition to anti-torque created by the rotor magnets.

The insulators 281, 282 are formed with a curving shape adapted to the shape of the location where the insulators will be attached, and are formed so as to mate with serrated edges of the coil winding patterns 211a formed at the internal peripheral edge and external peripheral edge. By fastening the insulators 281, 282 to the coil plate 211, it is possible to hold the internal peripheral edge and external peripheral edge of the coil plate 211 and to increase the strength of the plate. Furthermore, the stator coil 201 side is subjected to high levels of torque reaction force, and the arrangement described above can withstand such high torque reaction force.

According to the present invention set forth hereinabove, in which patterning is carried out with high accuracy by etching, wire cutting, or the like, unneeded space in the coil 10 can be minimized, and the coil lamination factor can be maximized as a result. Furthermore, since copper sheeting is used, strength can be increased, in contrast to most typical wiring structures known in the art.

Next, a fabrication example in which the two individual coil plate elements 211-1, 211-2 that make up the coil plate 211 discussed earlier are formed by stacking and bonding a predetermined number of thin metal sheets with slits 242 and wiring patterns 241 formed by an etching process will be described with reference to FIG. 27.

Figure 27:
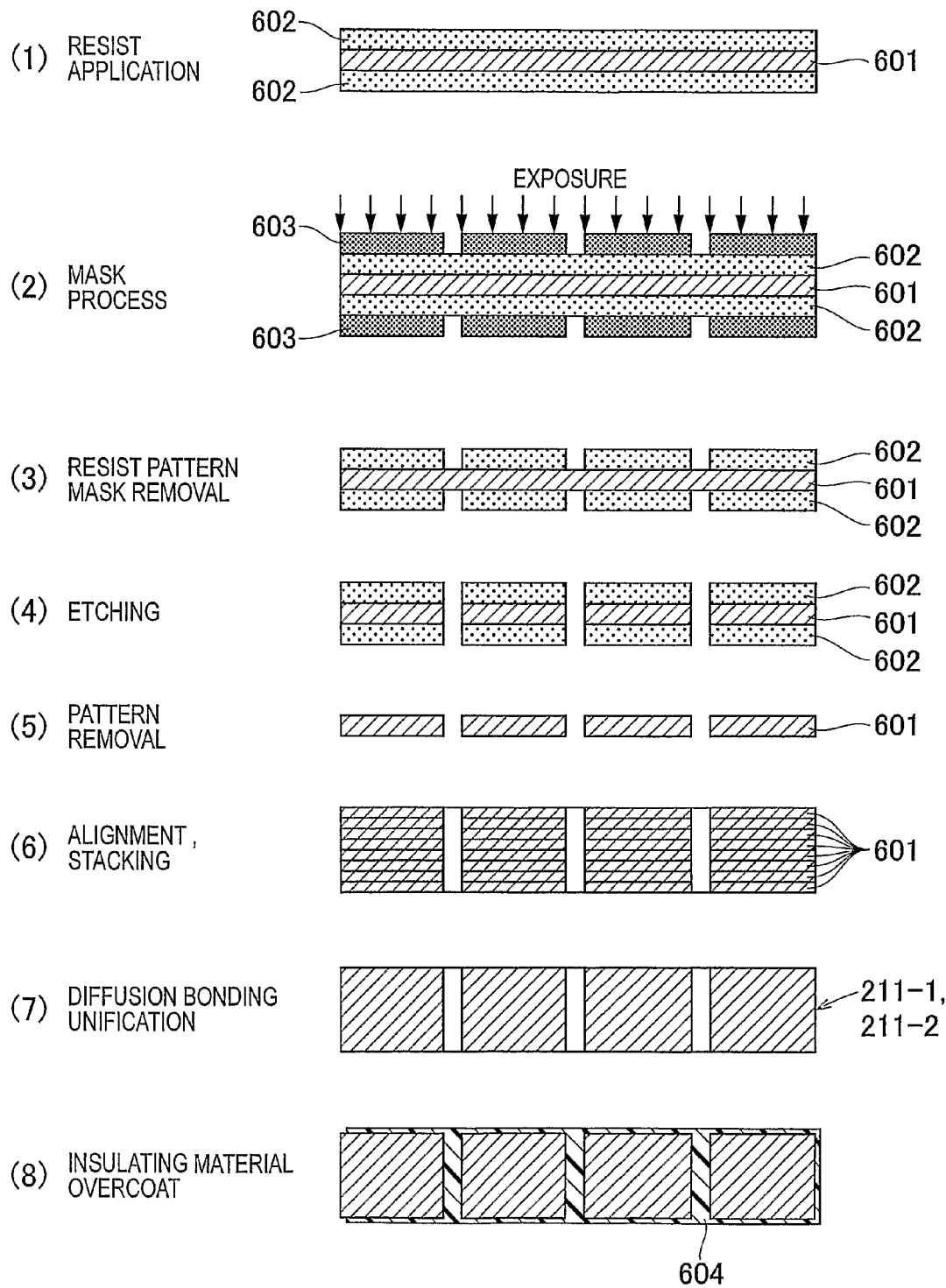
FIG. 27 illustrates the fabrication process of a coil plate element on the basis of an "etched winding concept."

FIG. 27 depicts the fabrication process relating to an "etched winding concept" for fabrication of coil plate elements by eight process steps (1) to (8).

The fabrication process of the aforementioned coil plate elements (211-1, 211-2) depicted in FIG. 27 involves, in order, (1) a resist application step, (2) a mask process step, (3) a mask process step, (4) etching, (5) a pattern removal step, (6) an alignment/stacking step, (7) a diffusion bonding unification step, and (8) an insulating material overcoat step.

In the aforementioned resist application step, photoresists 602 are applied onto the front and back surfaces of a copper sheet 601. In the mask process step, photomasks 603 are individually formed on the surfaces of the front and back photoresists 602, followed by an exposure process to form pattern wiring patterns on the photoresists 602. The photomasks 603 are then removed in the resist pattern mask removal step. In the etching step, the copper sheet 601 is etched in accordance with the patterns formed on the photoresists 602, and the patterns are formed. The photoresists 602 are stripped in the pattern removal step.

The copper sheets 601 provided with the wiring patterns are completed by the above process, and a number of such copper sheets (e.g., eight) is completed, and the copper sheets are then stacked up as shown in the alignment/stacking step. The plurality of copper sheets 601 is then integrated through diffusion bonding in the subsequent diffusion bonding unification step, and the aforementioned coil plate elements 211-1, 211-2 are formed. In the final insulating material overcoat step, the coil plate elements are coated with an insulating material 604. Subsequently, internal and external peripheral machining (conductor layer cutting) is performed to complete the winding loops. This completes fabrication of the coil plate elements.

The configurations, shapes, sizes, and placement relationships described in the embodiment hereinabove have been simplified with a view to aid in the understanding and reduction to practice of the present invention, and the numerical values and compositions (materials) of the configurations are merely exemplary. Accordingly, the present invention is in no way limited to the embodiment set forth herein and permits of various modifications without departing from the scope of the technical concept shown in the appended claims.

INDUSTRIAL APPLICABILITY

The present invention can be used as a coil assembly for a rotating electric machine for an in-wheel motor incorporated into the wheel of vehicle, or the like.

We claim:
1. A coil assembly for use in a stator of a rotating electric machine, comprising:
a coil plate having at least two coil plate elements,
wherein each of the coil plate elements is formed of a plurality of metal sheets stacked and integrated, the coil plate elements respectively have an inner peripheral portion and an outer peripheral portion, as well as predeter- mined etched wiring patterns formed by etched slits, and are bonded together at the inner peripheral portion and the outer peripheral portion while spaced apart in a medial portion lying between the inner peripheral portion and the outer peripheral portion, so as to provide predetermined coil winding patterns, wherein the etched wiring patterns of the opposed different coil plate elements being bonded in a mutually reversed state.

2. The coil assembly of claim 1, further comprising an insulating portion which includes at least one of an insulating coating covered by the coil plate elements and an insulating filler material filling gaps between the coil plate elements.

3. The coil assembly of claim 2, wherein the insulating coating material is one selected from the group comprised of polyimide, poly-para-xylene and DLC (diamond-like carbon).

4. The coil assembly of claim 2, wherein the insulating filler material is one selected from the group comprised of a thermosetting resin, a thermoplastic resin and an ultraviolet curing resin.

5. The coil assembly of claim 4, wherein the thermosetting resin, the thermo-plastic resin or the ultraviolet curing resin is one selected from the group comprised of epoxy, phenol, DPA (diallyl phthalate), polyester, polyimide, polyamide, polyamide-imide, PBT (polybutylene terephthalate), PET (polyethylene terephthalate), PPS (polyphenyl sulfide), LCP (liquid crystal polymer) and silicone (silicone resin).

6. The coil assembly of claim 1, wherein the coil plate comprises an annular plate member having an inner peripheral edge insulator and an outer peripheral edge insulator for respectively holding the inner peripheral edge and outer peripheral edge of the coil plate.

7. The coil assembly of claim 1, wherein the coil plate elements are formed by etching of a metal sheet.

8. The coil assembly of claim 7, wherein the metal sheet and the thin metal sheets are formed of one of copper, copper alloy, aluminum and aluminum alloy.

9. The coil assembly of claim 1, wherein the coil plate elements are formed by subjecting a metal sheet to electrical discharge machining, wire cutting, laser cutting, or notch pressing.

10. The coil assembly of claim 1, further comprising a current-carrying coil bus bar disposed at the inner peripheral edge of the coil plate.

11. The coil assembly claim 1, wherein the etched wiring patterns are comprised of a plurality angled line-shaped coil segments arrayed at equal intervals in a circumferential direction.

12. The coil assembly of claim 11, wherein the angled line-shaped coil segments are larger in circumferential width at the outer peripheral side than at the inner peripheral side thereof, and circumferential widths of the etched slits are constant.

13. The coil assembly of claim 11, wherein the etched slits are larger in circumferential width at the outer peripheral side than at the inner peripheral side thereof, and circumferential widths of the angled line-shaped coil segments are constant.

14. The coil assembly of claim 11, wherein the angled line-shaped coil segments have a center direction straight portion that faces towards a center of the coil plate, diagonal straight portions disposed facing a diagonal direction, and bonded portions at the inner peripheral portion and the outer peripheral portion.

15. The coil assembly of claim 1, wherein the coil wiring patterns are provided with coil loops corresponding in number to n phases that number two or more.

16. The coil assembly of claim 15, wherein a phase angle range respectively occupied in the circumferential direction by the coil loops is ⅓ of a pole pitch angle of magnets arrayed in the circumferential direction in correspondence with the coil plate.

17. The coil assembly of claim 16, wherein the coil loops include first and second coil loop elements of identical shape, with the first and second coil loop elements disposed so as to have a circumferential direction phase difference equivalent to the pole pitch angle.

18. The coil assembly of claim 17, wherein the first and second coil loop elements each have a wave winding-shaped configuration, circulating electrical current flows in mutually opposite directions through the first and second coil loop elements, and the center direction straight portions disposed facing towards the center of the coil plate in the angled line-shaped coil segments comprised of the first and second coil loop elements are positioned in mutual opposition so that electrical current flows in the same direction therethrough.

19. The coil assembly of claim 1, wherein the at least two coil plate elements are bonded together by means of diffusion bonding, thermocompression bonding, or brazing.

20. The coil assembly of claim 1, wherein a ceramic sheet is disposed in the gap between the at least two coil plate elements.

21. The coil assembly of claim 1, wherein a ceramic spray coating is applied to each of the at least two coil plate elements such that the coating faces the gap therebetween.

22. A rotating electric machine comprising:
a stator equipped with at lease one coil assembly; and
a rotor,
wherein the coil assembly is comprised of a coil plate having at least two coil plate elements, each formed of a plurality of metal sheets stacked and integrated, and the coil plate elements are each provided with an inner peripheral portion and an outer peripheral portion and have predetermined etched wiring patterns formed by etched slits and are bonded together at the inner peripheral portion and the outer peripheral portion while spaced apart in a medial portion lying between the inner peripheral portion and the outer peripheral portion, so as to provided predetermined coil winding patterns, wherein the etched wiring patterns of the opposed different coil plate elements being bonded in a mutually reversed state.

23. The rotating electric machine of claim 22, wherein the rotor is positioned on one or both sides of the stator so that the machine has an axially-gapped disk form.

24. The rotating electric machine of claim 23, wherein a shared shaft-shaped center portion is provided to a center portion of the stator and a center portion of the rotor; and at least one of a cooling system and a power supply system is disposed in a centralized arrangement in the shaft-shaped center portion.

25. The rotating electric machine of claim 22, wherein it comprises an in-wheel motor incorporated into a vehicle wheel and providing rotary drive of the vehicle wheel.

* * * * *